US012694679B2

(12) United States Patent
Heritier

(10) Patent No.: US 12,694,679 B2
(45) Date of Patent: Jul. 28, 2026

(54) VEHICLE IDENTIFICATION SYSTEM

(71) Applicant: GENETEC INC., Saint-Laurent (CA)

(72) Inventor: Maguelonne Heritier, Pierrefonds (CA)

(73) Assignee: GENETEC INC., Saint-Laurent (CA)

( * ) Notice: Subject to any disclaimer, the term of this patent is extended or adjusted under 35 U.S.C. 154(b) by 435 days.

(21) Appl. No.: 17/695,237

(22) Filed: Mar. 15, 2022

(65) Prior Publication Data

US 2023/0298350 A1 Sep. 21, 2023

(51) Int. Cl.
*G06V 20/50* (2022.01)
*G06T 7/70* (2017.01)
*G06V 10/75* (2022.01)
*G06V 10/82* (2022.01)

(52) U.S. Cl.
CPC .............. *G06V 20/50* (2022.01); *G06T 7/70* (2017.01); *G06V 10/757* (2022.01); *G06V 10/82* (2022.01); *G06T 2207/10016* (2013.01); *G06T 2207/20084* (2013.01); *G06T 2207/20092* (2013.01); *G06T 2207/30248* (2013.01); *G06V 2201/08* (2022.01)

(58) Field of Classification Search
CPC ...... G06V 20/50; G06V 10/757; G06V 10/82; G06V 2201/08; G06V 20/64; G06V 2201/10; G06V 10/751; G06T 7/70; G06T 2207/10016; G06T 2207/20084; G06T 2207/20092; G06T 2207/30248
See application file for complete search history.

(56) References Cited

U.S. PATENT DOCUMENTS

| | | | |
|---|---|---|---|
| 10,664,722 B1 | 5/2020 | Sharma et al. | |
| 2003/0235332 A1* | 12/2003 | Moustafa | G06F 18/2137 |
| | | | 382/157 |
| 2017/0032222 A1 | 2/2017 | Sharma et al. | |

(Continued)

FOREIGN PATENT DOCUMENTS

| | | | | |
|---|---|---|---|---|
| CN | 105719001 A | * | 6/2016 | G06K 9/6267 |
| CN | 107808126 A | * | 3/2018 | G06F 18/22 |

(Continued)

OTHER PUBLICATIONS

Mai, L. et al., Multi-view Vehicle Re-Identification Method Based on Siamese Convolutional Neural Network Structure, 2020 IEEE International Consumer Electronics (ICCE—Taiwan), https://ieeexplore.ieee.org/document/9257994, Nov. 23, 2020, pp. 1-2.

(Continued)

*Primary Examiner* — Huo Long Chen
(74) *Attorney, Agent, or Firm* — NORTON ROSE FULBRIGHT CANADA LLP

(57) ABSTRACT

The present disclosure relates to methods and systems for identifying a categorization of a vehicle depicted in an input image. Using a neural network, a feature vector of a vehicle is generated based on an input image. An orientation of the vehicle is determined based on the input image. A set of reference vectors is selected from a library of reference vectors based on the orientation of the vehicle. At least one close match reference vector is identified by comparing the feature vector of the vehicle to a plurality of reference vectors, including at least said set of selected reference vectors. An indication of the categorization of the vehicle is output based on the at least one close match reference vector.

30 Claims, 15 Drawing Sheets

(56) References Cited

U.S. PATENT DOCUMENTS

| | | | | |
|---|---|---|---|---|
| 2018/0039853 | A1 | 2/2018 | Liu et al. | |
| 2018/0165546 | A1* | 6/2018 | Skans | G06F 18/214 |
| 2018/0173953 | A1* | 6/2018 | Ghata | G06F 18/2413 |
| 2020/0327308 | A1* | 10/2020 | Cheng | G06F 18/253 |
| 2021/0004589 | A1 | 1/2021 | Turkelson et al. | |
| 2021/0125036 | A1 | 4/2021 | Tremblay et al. | |
| 2021/0149971 | A1* | 5/2021 | Duan | G06F 16/953 |
| 2021/0158014 | A1 | 5/2021 | Iatsun et al. | |
| 2021/0192214 | A1* | 6/2021 | Jiang | G06V 10/82 |
| 2021/0294834 | A1* | 9/2021 | Mai | G06V 10/25 |
| 2021/0342643 | A1 | 11/2021 | Bai et al. | |
| 2021/0406510 | A1 | 12/2021 | Kazdaghli et al. | |
| 2022/0351525 | A1* | 11/2022 | Carson | G06V 20/58 |

FOREIGN PATENT DOCUMENTS

| | | | | | |
|---|---|---|---|---|---|
| CN | 110363224 | A | * 10/2019 | | G06F 16/583 |
| EP | 3933693 | | 1/2022 | | |
| WO | WO-2017129015 | A1 | * 8/2017 | | |

OTHER PUBLICATIONS

Moosavi, S., Deep Person Re-Identification Using Supervised Learning With Ranking Method, The University of Texas at San Antonia, College of Engineering Department of Electrical and Computer Engineering, May 2019, pp. 1-14.

Sah, Melike et al., LightWeight Deep Convolutional Neural Networks for Vehicle Re-Identification using Diffusion-based Image Masking, 2020 3rd International Congress on Human-Computer Interaction, Optimization and Robotic Applications (HORA), 2021 IEEE—DOI: 10.1109/HORA52670.2021.9461345, pp. 1-6.

A friendly introduction to Siamese Networks by Sean Benhur J., Towards Data Science, https://towardsdatascience.com/a-friendly-introduction-to-siamese-networks-85ab17522942.

Mottaghi et al., "A Coarse-to-Fine Model for 3D Pose Estimation and Sub-category Recognition", 2015 IEEE Conference on Computer Vision and Pattern Recognition (CVPR), Boston, MA, USA, 2015, pp. 418-426, doi: 10.1109/CVPR.2015.7298639.

* cited by examiner

*300*

Selecting, from a plurality of images produced by a camera, at least one image containing the vehicle as the input image    *310*

Generating, using a neural network, a feature vector of the vehicle based on the input image    *320*

Determining an orientation of the vehicle based on the input image    *330*

Selecting a set of reference vectors from a library of reference vectors based on the orientation of the vehicle    *340*

Identifying at least one close match reference vector by comparing the feature vector of the vehicle to a plurality of reference vectors including at least the reference vectors of said selected set of reference vectors    *350*

Outputting an indication of the categorization of the vehicle based on the at least one close match reference vector    *360*

$$405 \quad \begin{bmatrix} 1 & 2 & 7 \\ 1 & 0 & 4 \\ 0 & 1 & 4 \\ 1 & 3 & 3 \\ 5 & 1 & 3 \\ 1 & 2 & 1 \\ 4 & 1 & 6 \\ 6 & 7 & 9 \\ 8 & 7 & 9 \\ 7 & 2 & 2 \\ 1 & 6 & 0 \end{bmatrix}$$

| | Make | Model | Generation (Year Range) | Class | Size | Features | ⋮ |
|---|---|---|---|---|---|---|---|
| | Audi | Q5 | 2011-2017 | SUV | Compact | Roof Rack | |
| | Audi | Q7 | 2006-2014 | SUV | Mid-Size | Rear Window Shield | |
| | Toyota | Corolla | 2017-2021 | Sedan 4 Door | Mid-Size | Lower Glass Tail-Light | |
| | Acura | TSX | 2016-2020 | Sedan 4 Door | Mid-Size | Make | |

FIG. 4C

Vehicle 0
Honda Element
SUV 5 doors Compact
Passenger Vehicle
Honda
Frontside
Light Green

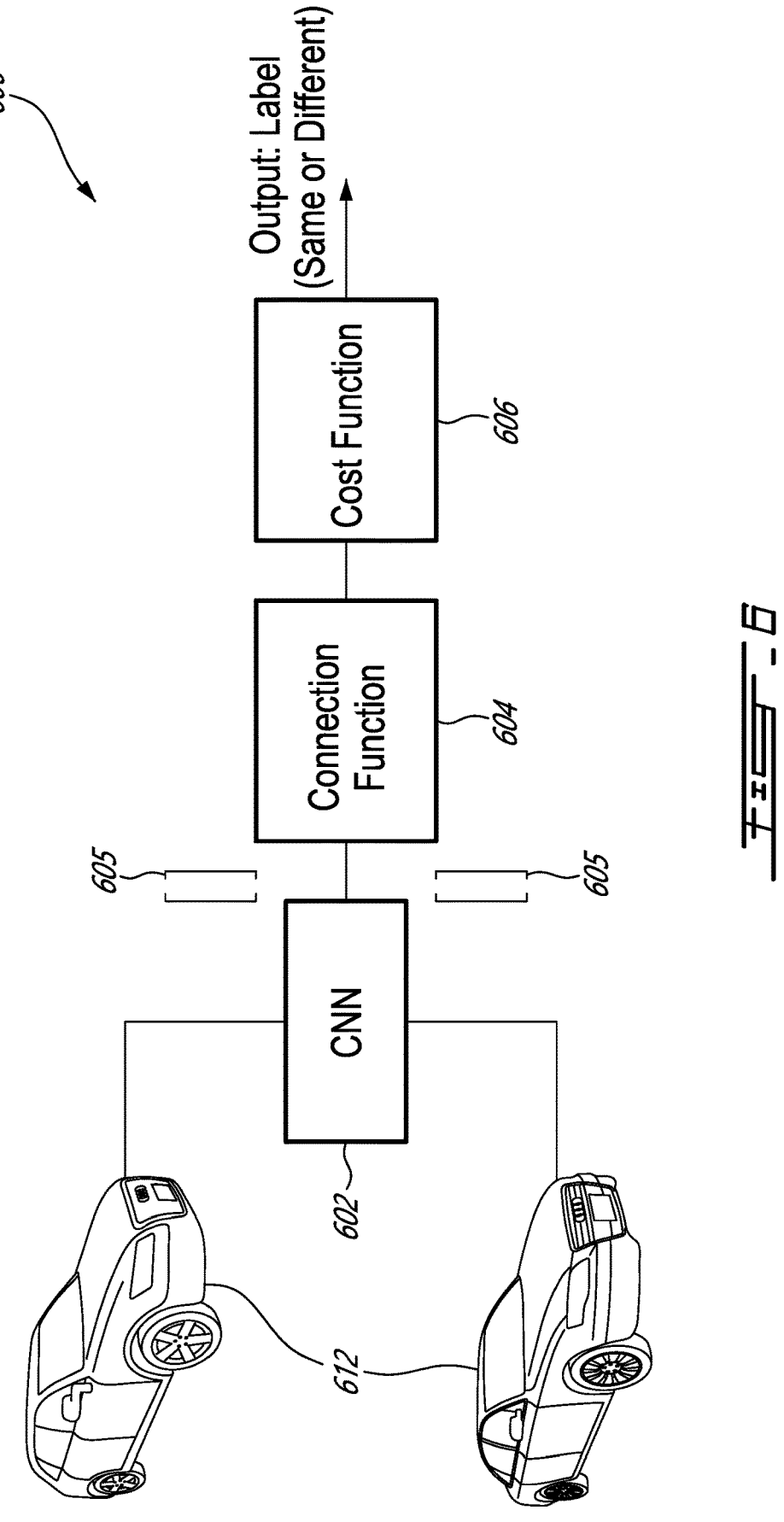
_FIG. 6_

700

Providing or operating the vehicle identification system having functionality to identify a categorization of a first plurality of vehicles from an input image depicting a vehicle of the first plurality of vehicles by generating, using a neural network, a feature vector based on the input image and by comparing the feature vector to at least part of a library of reference vectors based on an orientation of the vehicle to identify at least one close match reference vector, wherein said identifying the categorization comprises providing an indication of the categorization of the vehicle depicted in the input image based on the at least one close match reference vector ⟶ 710

Obtaining an additional input image depicting an additional vehicle absent from the first plurality of vehicles ⟶ 720

Obtaining at least one additional reference vector associated with the at least one additional vehicle absent from the first plurality of vehicles ⟶ 730

Updating the library of reference vectors to include the at least one additional reference vector thereby updating the functionality of the vehicle identification system to identify a categorization of the at least one vehicle ⟶ 740

Identifying, with the vehicle identification system, a subsequent vehicle sharing at least one categorization with the additional vehicle and depicted in a subsequent input image on the basis of said updated library of reference vectors without retraining the neural network ⟶ 750

FIG. 7

Add Vehicle 910

Save 912

Vehicle Information 930

Make

Model

Trim

Year

Class

Size

Orientation

920

922

902

900

*1000*

Providing or operating the vehicle identification system having functionality to identify a categorization of a first plurality of vehicles from an input image depicting a vehicle of the first plurality of vehicles by generating, using a neural network, a feature vector based on the input image and by comparing the feature vector to at least part of a library of reference vectors based on an orientation of the vehicle to identify at least one close match reference vector, wherein said identifying the categorization comprises providing an indication of the categorization of the vehicle depicted in the input image based on the at least one close match reference vector     *1010*

Obtaining a subsequent image depicting a subsequent vehicle present in the first plurality of vehicles     *1020*

Obtaining a subsequent feature vector associated with the subsequent vehicle present in the first plurality of vehicles     *1030*

Updating the library of reference vectors to include the at least one additional reference vector thereby updating the functionality of the vehicle identification system to identify a categorization of the at least one vehicle     *1040*

Updating a corpus of images used to train the neural network to include the subsequent image     *1050*

Identifying, with the vehicle identification system, an additional vehicle sharing at least one categorization with the subsequent vehicle and depicted in an additional input image on the basis of said updated library of reference vectors without retraining the neural network     *1060*

*FIG. 10*

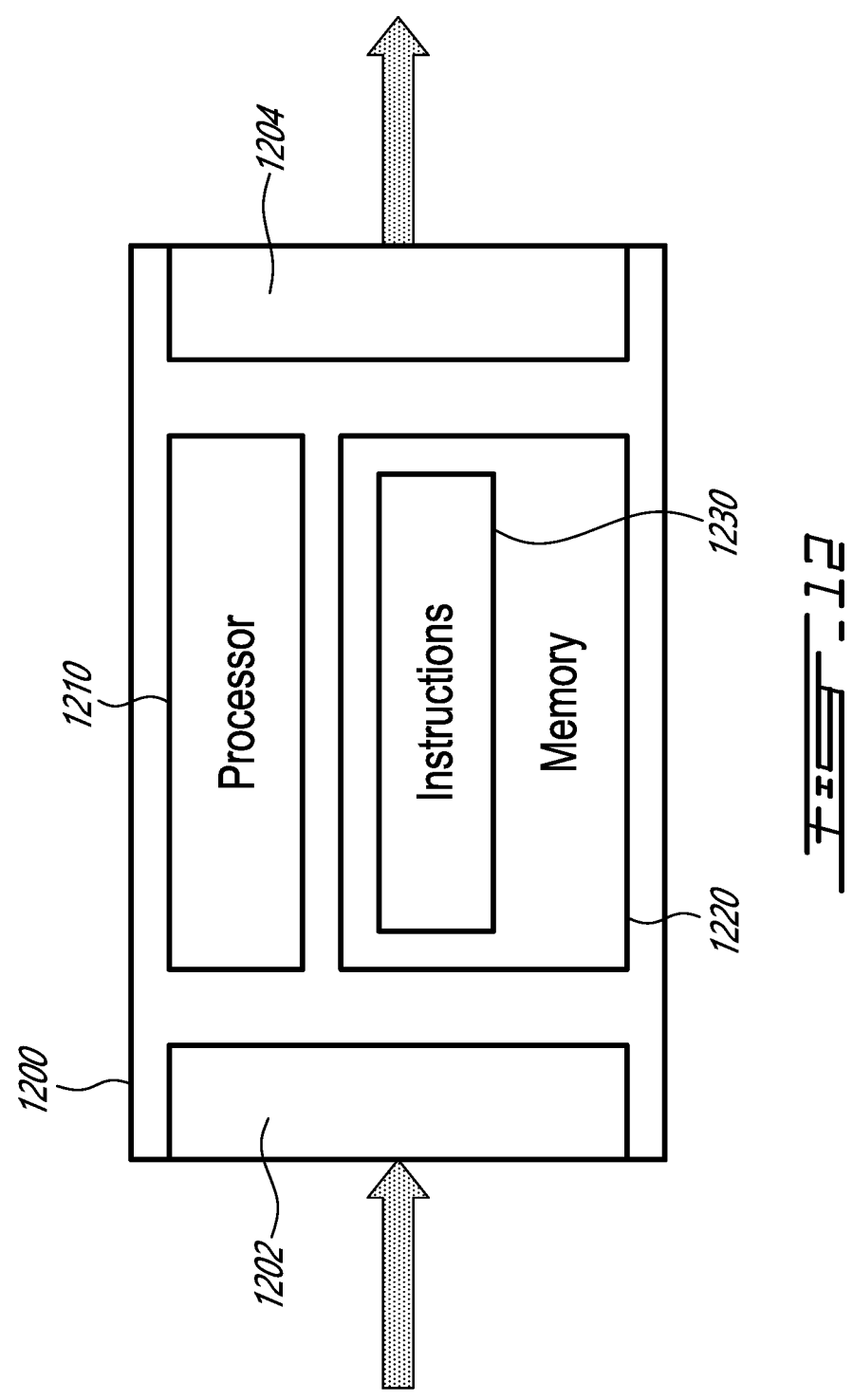

VEHICLE IDENTIFICATION SYSTEM

FIELD

The present disclosure relates generally to surveillance systems, and more specifically to systems for surveilling and identifying vehicles.

BACKGROUND

Surveillance systems are used in a wide variety of settings to locate, identify, and categorize various types of objects and persons. Surveillance systems can be implemented using a wide variety of devices, including microphones, cameras, motion sensors, and the like. Surveillance systems can be used to collect information about objects in a given area and can relay that information to automated information processing systems, which may in turn extract key information to assist human operators in making safety decisions.

One type of surveillance systems are vehicle identification systems, which may serve to identify various characteristics or categorizations of a vehicle. Existing systems for identifying vehicles typically rely on human operators to assess characteristics of an observed vehicle, or function by mapping a read license plate to a registration database, for instance operated by a government or regulatory body. However, human-operated systems can be unreliable and require significant workforce investments; additionally, obtaining access to registration databases can pose privacy concerns, and a vehicle's license plate may not always be visible or readable. Recent advances in so-called "artificial intelligence" systems may facilitate identification of vehicles by computer-operated systems, but these systems rely on exhaustive corpuses of data, which may not be available, and require frequent retraining to account for new makes and models of vehicles, which is time and resource intensive.

So, though existing approaches for vehicle identification serve their purpose, improved techniques remain desirable.

SUMMARY

The following presents a simplified summary of one or more implementations in accordance with aspects of the present disclosure in order to provide a basic understanding of such implementations, without limiting the embodiments presented within the present disclosure. While systems and methods for identifying a vehicle on the basis of a license plate identifier or the like are beneficial, identifying other information about a vehicle may be of use in other contexts. For instance, a witness at a crime scene may not remember the license plate identifier of a getaway vehicle, but they may remember that the car was a blue SUV of a particular make and model, or that the vehicle was silver and featured a roof rack and low fog lights. In this context, systems and methods for vehicle identification which produce a list of categorizations for vehicles depicted in an input image— e.g., vehicle make, model, and trim, generation, vehicle class and size, and other features of the vehicle—may assist authorities in corroborating video or image footage from a crime scene with witness testimony. Vehicle categorization information can also be cross-referenced with license plate registration information to determine whether a read license plate does indeed correspond to the vehicle bearing that license plate.

To this end, the present disclosure describes (in one or more example implementations) a vehicle identification system which uses a neural network to generate a feature vector of a vehicle, based on an input image depicting the vehicle. The feature vector is much like a "fingerprint" of the vehicle, insofar as it is a unique or pseudo-unique numerical representation of various features of the vehicle, albeit not necessarily in a format intelligible to humans. The feature vector of the vehicle depicted in the input image can then be compared to a library of reference vectors, which are associated with different vehicles having known categorizations. A close match between the feature vector and a particular reference vector indicates a strong likelihood that the vehicle depicted in the input image shares categorizations with the vehicle associated with the particular reference vector (i.e., that they are the same or similar vehicles). For instance, if the vehicle depicted in the input image is a SUV of a given make and model, its feature vector will closely resemble the reference vector associated with the SUV of that given make and model. In this fashion, the system can be said to be reidentifying vehicles, as one or more reference vectors which are close matches to the feature vector are used to indicate categorizations of the vehicle.

The neural network used in the vehicle identification system does not identify the vehicle itself; instead, it is used to generate the feature vector for the vehicle depicted in the input image. As a result, the neural network can also be used to generate the reference vectors, without any retraining or modification. The neural network can be provided with images depicting known vehicles, and the resulting feature vectors can be stored in a database in association with categorization information for the known vehicles, forming the aforementioned library of reference vectors. As new vehicles are released, the same neural network can be used to generate new reference vectors for the new vehicles, which can be used to augment the library. In this fashion, the vehicle identification system can be updated to identify new vehicles without requiring any changes to the neural network used by the vehicle identification system. In some cases, the vehicle identification system can be provided with reference vectors for different vehicle orientations; that is to say, for a given make, model, generation, etc., of a vehicle, a first reference vector may be for the vehicle seen from the front, a second reference vector may be for a vehicle seen from the rear or the side, and the like. The vehicle identification system can detect the orientation of the vehicle in an input image, and reduce the number of comparisons made between the feature vector and the collection of reference vectors on the basis of the detected orientation of the vehicle in the input image.

The present disclosure describes, inter alia, vehicle identification systems, as well as methods, devices, and computer-readable media for vehicle identification and for implementing vehicle identification systems.

In accordance with a broad aspect, there is provided a method for identifying a categorization of a vehicle depicted in an input image. The method comprises: generating, using a neural network, a feature vector of the vehicle based on the input image; determining an orientation of the vehicle based on the input image; selecting a set of reference vectors from a library of reference vectors based on the orientation of the vehicle; identifying at least one close match reference vector by comparing the feature vector of the vehicle to a plurality of reference vectors including at least said selected set of reference vectors; and outputting an indication of the categorization of the vehicle based on the at least one close match reference vector.

In at least some embodiments according to any one or more of the previous embodiments, the method comprises selecting, from a plurality of images produced by a camera, at least one image containing the vehicle as the input image.

In at least some embodiments according to any one or more of the previous embodiments, said selecting the at least one image containing the vehicle as the input image comprises performing object recognition on the plurality of images to identify the at least one image containing the vehicle.

In at least some embodiments according to any one or more of the previous embodiments, said selecting the at least one image containing the vehicle as the input image comprises performing quality detection on the plurality of images to identify, of the plurality of images, the at least one image based on meeting a quality threshold.

In at least some embodiments according to any one or more of the previous embodiments, said selecting the at least one image containing the vehicle as the input image comprises obtaining a video stream from a camera and extracting, from the video stream, the input image.

In at least some embodiments according to any one or more of the previous embodiments, said determining the orientation comprises providing the input image to a classifier neural network and obtaining, from the classifier neural network, an orientation indication for the vehicle.

In at least some embodiments according to any one or more of the previous embodiments, said determining the orientation comprises identifying a camera which produced the input image, and said determining the orientation is based on a known physical configuration of the camera.

In at least some embodiments according to any one or more of the previous embodiments, said identifying the at least one close match reference vector comprises evaluating projected distances between the feature vector of the vehicle and the plurality of reference vectors In at least some embodiments according to any one or more of the previous embodiments, said identifying the at least one close match reference vector comprises identifying a predetermined number of close match reference vectors, and said outputting the indication of the categorization of the vehicle comprises indicating at least one categorization for each of the predetermined number of close match reference vectors.

In at least some embodiments according to any one or more of the previous embodiments, said outputting the indication of the categorization of the vehicle comprises indicating at least one of a make and a model of the vehicle.

In at least some embodiments according to any one or more of the previous embodiments, said outputting the indication of the categorization of the vehicle comprises indicating a generation of the vehicle.

In at least some embodiments according to any one or more of the previous embodiments, said outputting the indication of the categorization of the vehicle comprises indicating a vehicle class of the vehicle.

In at least some embodiments according to any one or more of the previous embodiments, said outputting the indication of the categorization of the vehicle comprises indicating a vehicle size of the vehicle.

In at least some embodiments according to any one or more of the previous embodiments, said outputting the indication of the categorization of the vehicle comprises indicating whether the vehicle is equipped with modifications relative to a base model.

In accordance with another broad aspect, there is provided a vehicle identification system for identifying a categorization of a vehicle depicted in an input image. The system comprises: a neural network configured for generating a feature vector of the vehicle based on the input image; and a controller coupled to the neural network for obtaining the feature vector therefrom and configured for: determining an orientation of the vehicle based on the input image; selecting a set of reference vectors from a library of reference vectors based on the orientation of the vehicle; identifying at least one close match reference vector by comparing the feature vector of the vehicle to a plurality of reference vectors including at least said selected set of reference vectors; and outputting an indication of the categorization of the vehicle based on the at least one close match reference vector.

In accordance with a further broad aspect, there is provided a method for updating a vehicle identification system. The method comprises: operating the vehicle identification system having functionality to identify a categorization of a first plurality of vehicles from an input image depicting a vehicle of the first plurality of vehicles by generating, using a neural network, a feature vector based on the input image and by comparing the feature vector to at least part of a library of reference vectors based on an orientation of the vehicle to identify at least one close match reference vector, wherein said identifying the categorization comprises providing an indication of the categorization of the vehicle depicted in the input image based on the at least one close match reference vector; obtaining at least one additional reference vector associated with at least one additional vehicle absent from the first plurality of vehicles; updating the library of reference vectors to include the at least one additional reference vector thereby updating the functionality of the vehicle identification system to identify a categorization of the at least one additional vehicle; and identifying, with the vehicle identification system, a subsequent vehicle sharing at least one categorization with the additional vehicle and depicted in a subsequent input image of the basis of said updated library of reference vectors without retraining the neural network.

In accordance with another broad aspect, there is provided a method of updating a vehicle identification system. The method comprises: providing the vehicle identification system having functionality to identify a categorization of a first plurality of vehicles from an input image depicting a vehicle of the first plurality of vehicles by generating, using a neural network, a feature vector based on the input image and by comparing the feature vector to at least part of a library of reference vectors based on an orientation of the vehicle to identify at least one close match reference vector, wherein said identifying the categorization comprises providing an indication of the categorization of the vehicle depicted in the input image based on the at least one close match reference vector; obtaining at least one additional reference vector associated with at least one additional vehicle absent from the first plurality of vehicles; and updating the library of reference vectors to include the at least one additional reference vector thereby updating the functionality of the vehicle identification system to identify a categorization of the at least one additional vehicle without retraining the neural network.

In at least some embodiments according to any one or more of the previous embodiments, said obtaining the at least one additional reference vector comprises using the neural network of the vehicle identification system to generate the at least one additional reference vector based on reference images of the at least one additional vehicle.

In at least some embodiments according to any one or more of the previous embodiments, updating the library of reference vectors of the vehicle identification system comprises associating categorizations of the at least one additional vehicle with the at least one additional reference vector.

In at least some embodiments according to any one or more of the previous embodiments, said associating the categorizations of the at least one additional vehicle comprises obtaining the categorizations of the at least one vehicle from a source affiliated with a manufacturer of the at least one vehicle.

In at least some embodiments according to any one or more of the previous embodiments, said associating the categorizations of the at least one additional vehicle comprises obtaining the categorization of the at least one vehicle from a user of the vehicle identification system based on user input provided by the user.

In at least some embodiments according to any one or more of the previous embodiments, said obtaining the at least one additional reference vector comprises receiving the at least one additional reference vector from a remote computer operated by an entity providing the vehicle identification system.

In at least some embodiments according to any one or more of the previous embodiments, said obtaining the at least one additional reference vector comprises generating the at least one additional reference vector using the neural network of the vehicle identification system.

In at least some embodiments according to any one or more of the previous embodiments, said obtaining the at least one additional reference vector comprises receiving the at least one additional reference vector from a remote computer operated by an entity providing the vehicle identification system.

In at least some embodiments according to any one or more of the previous embodiments, said obtaining the at least one additional reference vector is performed by a remote computer operated by an entity providing the vehicle identification system and comprises generating the at least one additional reference vector, the method comprising transmitting the at least one additional reference vector to the vehicle identification system from the remote computer.

In at least some embodiments according to any one or more of the previous embodiments, the method comprises obtaining an additional input image depicting an additional vehicle absent from the first plurality of vehicles, said obtaining the at least one additional reference vector is performed in response to said obtaining the additional input image.

In at least some embodiments according to any one or more of the previous embodiments, said obtaining the additional input image comprises determining that the additional input image depicts the additional vehicle absent from the first plurality of vehicles based on a distance between an additional feature vector of the additional vehicle, generated using the neural network, and at least one reference vector of the library of reference vectors associated with the first plurality of vehicles.

In at least some embodiments according to any one or more of the previous embodiments, said obtaining the additional input image comprises determining that the additional input image depicts the additional vehicle absent from the first plurality of vehicles based on a ratio of a first distance between an additional feature vector of the additional vehicle, generated using the neural network, and a first one of the plurality of reference vectors and a second distance between the second feature vector and a second one of the plurality of reference vectors exceeding a predetermined ratio threshold.

In at least some embodiments according to any one or more of the previous embodiments, the method comprises providing the additional input image to a remote computer operated by an entity providing the vehicle identification system.

In at least some embodiments according to any one or more of the previous embodiments, said providing the additional input image to a remote computer comprises flagging the additional input image for evaluation by personnel of the entity providing the vehicle identification system within a database associated with the remote computer.

In at least some embodiments according to any one or more of the previous embodiments, said obtaining the additional input image comprises obtaining the image from the vehicle identification system in response to the vehicle identification system failing to identify the vehicle.

In accordance with a still further broad aspect, there is provided a method for improving a vehicle identification functionality of a vehicle identification system. The method comprises: operating the vehicle identification system having functionality to identify a categorization of a first plurality of vehicles from an input image depicting a vehicle of the first plurality of vehicles by generating, using a neural network, a feature vector based on the input image and by comparing the feature vector to at least part of a library of reference vectors based on an orientation of the vehicle to identify at least one close match reference vector, wherein said identifying the categorization comprises providing an indication of the categorization of the vehicle depicted in the input image based on the at least one close match reference vector; obtaining a subsequent feature vector associated with a subsequent vehicle present in the first plurality of vehicles; updating the library of reference vectors based on the subsequent feature vector to improve the vehicle identification functionality of the vehicle identification system; and identifying, with the vehicle identification system, an additional vehicle sharing at least one characterization with the subsequent vehicle and depicted in an additional input image of the basis of said updated library of reference vectors without retraining the neural network.

In at least some embodiments according to any one or more of the previous embodiments, said updating the library of reference vectors comprises updating the database to additionally contain the subsequent feature vector.

In at least some embodiments according to any one or more of the previous embodiments, said updating the library of reference vectors comprises updating the database to replace a given one of the plurality of reference vectors with the subsequent feature vector In at least some embodiments according to any one or more of the previous embodiments, said obtaining the subsequent feature vector comprises receiving the subsequent feature vector from a remote computer operated by an entity providing the vehicle identification system.

In at least some embodiments according to any one or more of the previous embodiments, the method comprises obtaining, by the vehicle identification system, a subsequent input image depicting the subsequent vehicle and transmitting the subsequent input image from the vehicle identification system to the remote computer, said receiving the subsequent feature vector from the remote computer is performed responsive to said transmitting the subsequent input image.

In at least some embodiments according to any one or more of the previous embodiments, said transmitting the subsequent input image to the remote computer comprises flagging the subsequent input image for inclusion in a corpus of images used to train the neural network by the entity providing the vehicle identification system.

In at least some embodiments according to any one or more of the previous embodiments, said obtaining the subsequent feature vector comprises obtaining, by the vehicle identification system, a subsequent input image depicting the subsequent vehicle and generating, by the vehicle identification system, the subsequent feature vector.

In at least some embodiments according to any one or more of the previous embodiments, said obtaining the subsequent input image is performed in response to the vehicle identification system determining that the subsequent feature vector is farther than a predetermined distance threshold from the plurality of reference vectors.

In at least some embodiments according to any one or more of the previous embodiments, said obtaining the subsequent input image is performed in response to the vehicle identification system determining that a ratio of a first distance between the subsequent feature vector and a first one of the plurality of reference vectors and a second distance between the subsequent feature vector and a second one of the plurality of reference vectors exceeds a predetermined ratio threshold.

BRIEF DESCRIPTION OF THE DRAWINGS

For a more complete understanding of the present disclosure, reference is now made to the accompanying drawings. The following brief descriptions of the drawings should not be considered limiting in any fashion.

FIG. 3 is a flowchart illustrating an example method for identifying a categorization of a vehicle depicted in an input image.

FIG. 4C is an example illustration of a database of the vehicle identification system of FIG. 2.

FIG. 6 is a schematic diagram illustrating an example training methodology for a neural network of the vehicle identification system of FIG. 2.

FIG. 7 is a flowchart illustrating an example method for updating a vehicle identification system.

FIG. 10 is a flowchart illustrating an example method for improving a vehicle identification functionality of a vehicle identification system.

FIG. 12 is a block diagram of an example computing system.

It will be noted that throughout the appended drawings like features are identified by like reference numerals.

DETAILED DESCRIPTION

The present disclosure relates to vehicle identification systems and to various related methods, including methods for identifying a categorization of a vehicle depicted in an input image, for updating a vehicle identification system, and for improving a vehicle identification functionality of a vehicle identification system. In the present disclosure, the term "vehicle" is used to refer to all manner of machine used to transport persons or objects (i.e., freight or cargo), including bicycles, motor vehicles (cars, trucks, motorcycles, busses, etc.), rail vehicles, watercraft, aircraft, spacecraft, and the like. Although the present disclosure may present operating contexts and examples relating particularly to motor vehicles, and more specifically relating to cars, it should be understood that the present disclosure may be applied to various other types of vehicles, and may be embodied in systems and methods which perform vehicle identification by noting categorizations of one type of vehicle, or of multiple types of vehicles in concomitant fashion. In addition, although the present disclosure may refer, in certain operating contexts and examples, to a vehicle identification system in the singular, it should be understood that the vehicle identification system may include any suitable number of computers and/or other devices, may in fact be composed of multiple subsystems, which may together constitute the vehicle identification system, or that multiple independent vehicle identification systems may collaborate and/or be considered to compose a vehicle identification system.

Figure 1:
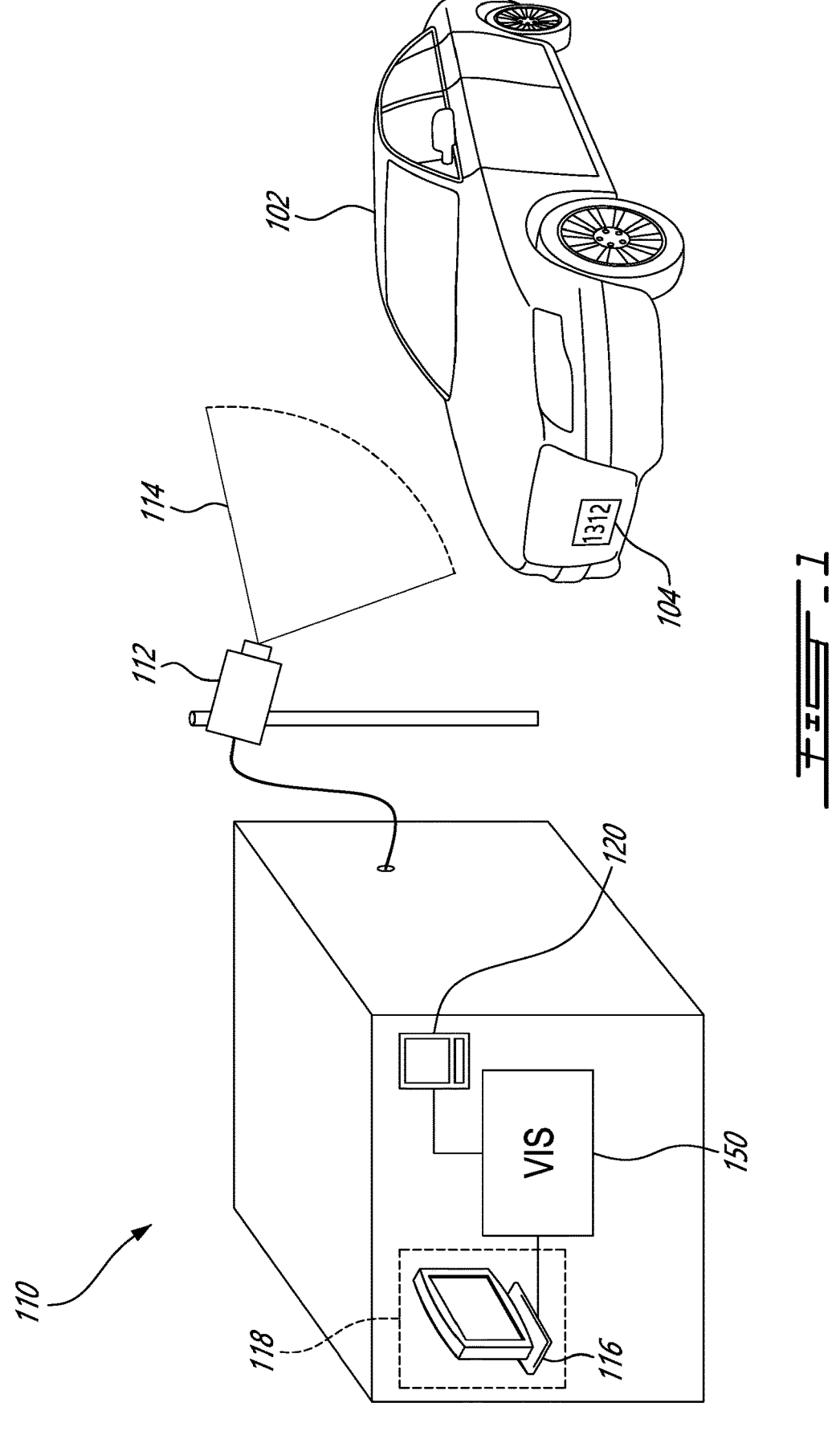
FIG. 1 is a schematic diagram of an example operating context of a vehicle identification system.

With reference to FIG. 1, an example operating context for a vehicle identification system (VIS) 150 is illustrated. The VIS 150 illustrated in FIG. 1 is shown as being deployed at a client site 110, though it should be understood that the VIS 150 may also be deployed remotely from the client site 110, may be operated on cloud infrastructure, may be operated via a decentralized system, or in any other suitable fashion. The VIS 150 is couplable to a display 116, which may be used to present information about vehicles identified by the VIS 150, including categorization data and/or any other suitable information, to a user of the VIS 150 (e.g., a human operator). The display 116 may be part of a broader human-computer interface, illustrated here at 118, via which the human operator can interact with the VIS 150, including providing instructions thereto, requesting information therefrom for display, and the like. By way of an example, the interface 118 includes various input devices coupled to the VIS 150, for instance a keyboard, a mouse, a touchpad, a touchscreen, a microphone, or any other suitable input device, via which the human operator can interact with the VIS 150. Additionally, the interface 118 may include additional output devices via which the VIS 150 can provide information to the operator, beyond the display 116. By way of an example, the interface 118 can include speakers, indicator lights, additional screens or displays beyond the display 116, vibrational actuators, and the like.

The client site 110 illustrated in FIG. 1 is also shown as including a camera 112, which is used for capturing one or more images of vehicles, such as the vehicle 104, visible in a field of view 114 of the camera 112. For example, the camera 112 can capture an input image 120 and provide it to the VIS 150, in conjunction with relevant metadata, additional contextual images, and the like. Additionally, in some embodiments the client site 110 may include any number of other sensors or devices uses to capture information about the vehicle 104. Examples of other sensors and devices include motion detectors, weight detectors, microphones, and the like. These other sensors can, for example, be used to detect the presence of the vehicle 104 in the field of view 114 of the camera 112, upon which the camera 112 can be activated to capture one or more images of the vehicle 104, some or all of which may serve as input images 120 to the VIS 150. In some cases, using additional sensors to detect the presence of the vehicle 104 as a trigger for activating the camera 112 may serve to conserve power.

Although illustrated here as including a single camera 112, it should be understood that the client site 110 may include any suitable number of cameras 112, which may be disposed in any suitable fashion for acquiring images of vehicles like the vehicle 104. By way of an example, the client site 110 is located near a highway or other multi-lane roadway, and multiple cameras 112 are disposed on a gantry or other structure above the roadway. Each of the cameras 112 is assigned to a specific lane to capture images of vehicles 102 as they drive through the fields of view 114 of the cameras 112. For instance, the cameras 112 may be positioned and/or programmed to capture images of a rear portion of the vehicles 102 which include a license plate of the vehicles 102. By way of another example, the camera 112 is mounted to a patrol car of a parking enforcement or police officer and is provided with a cellular radio or other communication device for communicating with the VIS 150, located remotely from the patrol car. By way of a further example, the camera 112 is a mobile camera set up on a movable tripod or other support structure beside a roadway. Once deployed, the camera 112 is couplable to a communications unit responsible for bridging communications between the camera 112 and the VIS 150. Other operating contexts are also considered, and the above should not be considered an exhaustive description of the same. For example, the camera 112 may be deployed within a parking garage for obtaining information about vehicles exiting and entering the parking garage. In some embodiments, the cameras 112 disposed at the client site 110 may have a variable field of view 114; for instance, the cameras 112 may be pan-tilt (PT) cameras, pan-tilt-zoom (PTZ) cameras, or the like. Also, in some embodiments, the cameras 112 may be disposed at locations remote from the client site 110 and/or from the VIS 150. In such embodiments, the cameras 112 may communicate with the VIS 150 and/or with other components at the client site 110 via one or more network connections, for instance a cellular network connection.

Figure 2:
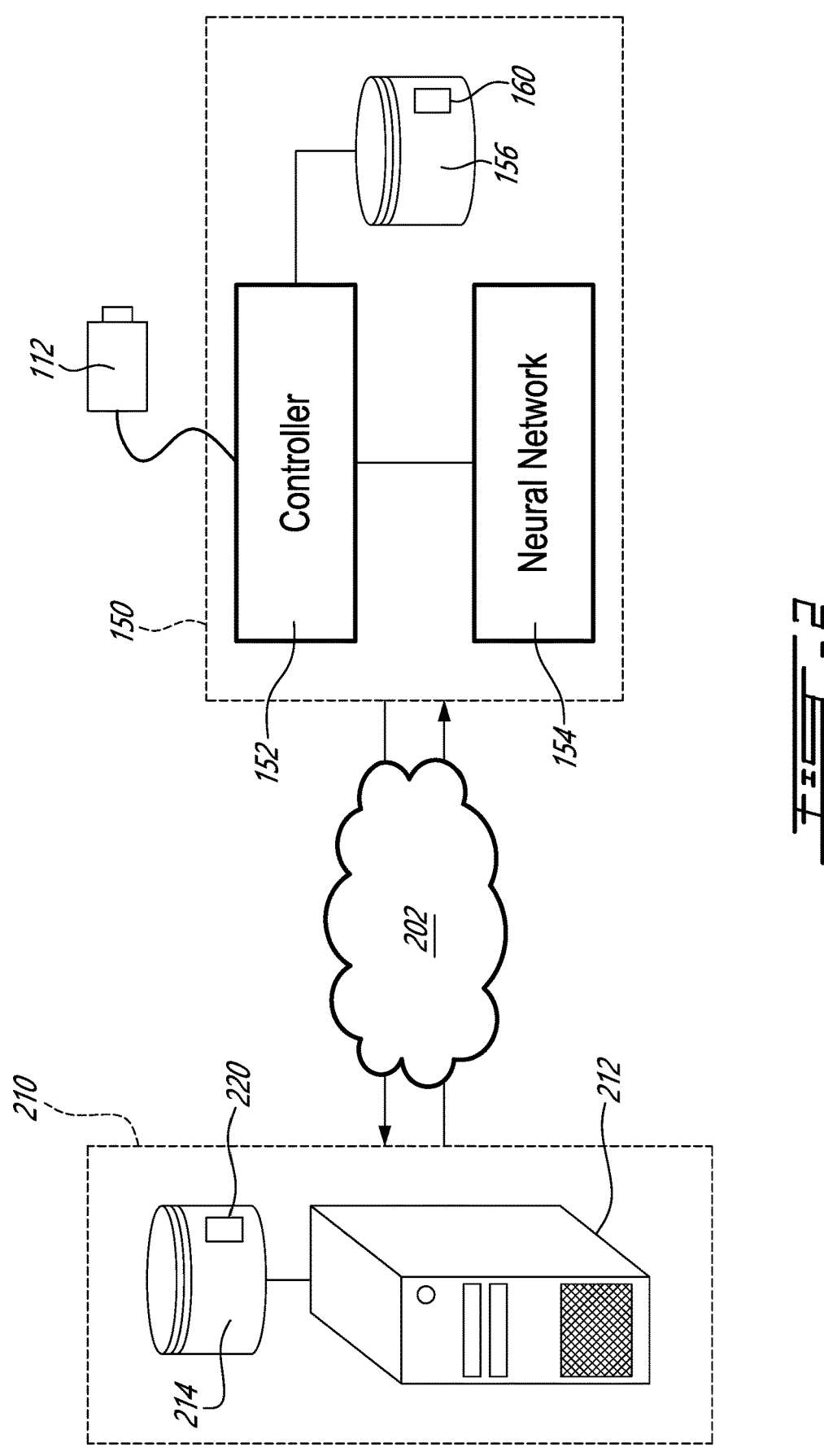
FIG. 2 is a schematic diagram of an example vehicle identification system.

With reference to FIG. 2, an embodiment of the VIS 150 is illustrated as being composed of a controller 152, a neural network 154, and a datastore 156. The VIS 150 is shown in FIG. 2 as being coupled to the camera 112 via a connection between the camera 112 and the controller 152. As noted hereinabove, the client site 110 may include any number of cameras 112, which may each be coupled to the VIS 150; as such, the VIS 150, via the controller 152, is capable of receiving input from any number of cameras 112. In some embodiments, the controller 152 implements a data queue or other data processing scheme for managing concurrent inputs from the cameras 112, as appropriate. The cameras 112 may also be disposed remotely from the VIS 150, and thus the connection between the camera(s) 112 and the controller 152 may be any suitable type of connection, including connections which traverse or make use of one or more networks. For example, the camera(s) 112 may be wiredly coupled to the VIS 150 via one or more wired connection, for instance using ethernet cabling. By way of another example, the camera(s) 112 may be coupled to the VIS 150 via a combination of wired and wireless connections, which may traverse various networks, as appropriate. Additionally, in some embodiments, the camera(s) 112 are operated by an entity separate from that which operates the VIS 150, and input images 120 provided by the camera(s) 112 to the VIS 150 may traverse one or more trust boundaries, which may use any suitable type of authentication to ensure safe transmittal of the input images 120.

The neural network 154 may be any suitable type of neural network, as described in greater detail hereinbelow. In some embodiments, the neural network 154 is a convolutional neural network (CNN), trained in accordance with the approach described hereinbelow. The datastore 156 may be any suitable type of computer-readable memory configured for storing information, including multiple separate memories which may be interconnected in any suitable fashion. The controller 152 of the VIS 150 is coupled to the neural network 154 and to the datastore 156 in any suitable fashion to allow for exchange of information, requests, commands, and the like, therebetween. Although FIG. 2 illustrates the controller 152, the neural network 154, and the datastore 156 as separate elements, it should be understood that depending on the particular implementation of the VIS 150, one or more of the elements of the VIS 150 may be implemented using common hardware, firmware, software, and/or any suitable combination thereof. For example, the VIS 150 is implemented using a conventional computing device, such as a personal computer or the like, which includes one or more processors, one or more computer-readable memories, one or more interfaces (e.g., a network interface, a peripheral interface, etc.), and any other suitable components. The controller 152 and the neural network 154 are implemented by way of the one or more processors executing instructions stored on the one or more memories, and the datastore 156 is implemented by way of the one or more memories. In some other embodiments, one or more of the controller 152, the neural network 154, and the datastore 156 may be implemented using dedicated hardware, firmware, software, or the like. For example, the VIS 150 is a computing device which includes a bespoke component for implementing the neural network, which interfaces with other components of the computing device implementing the controller 152 and the datastore 156. Other approaches are also considered. Additionally, in some embodiments, part or all of the VIS 150 may be implemented within the camera 112, which may communicate information to the interface 118 and/or to another system implementing other parts of the VIS 150. Put differently, any functionality ascribed to the camera 112 and the VIS 150, including components thereof, may be performed by any of the aforementioned elements in any suitable fashion.

The VIS 150 may also communicate with a server 212 via a network 202. In some embodiments, the VIS 150 obtains functionality updates from the server 212, as will be described in greater detail hereinbelow. Functionality updates may be provided at predetermined times, for instance on a predetermined schedule or at periodic intervals, or in a punctual manner, for instance in response to security vulnerabilities or functionality improvements. In some embodiments, the VIS 150 and the server 212 exchange information relating to the identification and categorization of vehicles. By way of examples, the VIS 150 can provide the server 212 with input images 120 acquired by the camera(s) 112, with information relating to identified vehicles 102, for instance a listing of licence plate identifiers, or the like. The server 212 can use a datastore 214 to store information acquired from the VIS 150, or other information relevant to the operation of the server 212 and/or the VIS 150, for instance information relating to updates to be provided to the VIS 150. As will be described in greater detail hereinbelow, the datastore 214, as well as the datastore 156 of the VIS 150, may also be used to store a library of reference vectors, illustrated here as libraries 160 and 220, usable for identifying a categorization of a vehicle depicted in an input image, for instance the input image 120. It should be understood that the library 160 stored in the datastore 156 need not be an identical copy of the library 220 stored in the datastore 214. In some embodiments, the library 160 stored in the datastore 156 includes a subset of entries stored in the library 220 of the datastore 214. For example, users of the VIS 150 can specify the types of vehicles they wish to be able to identify, and the library 160 may be provided to the VIS 150 as a subset of the library 220 which includes the entries necessary for identifying the specified types of vehicles. In some other embodiments, the libraries 160 and 220 store different entries from one-another, for instance based on user-provided entries obtained from an operator of the VIS 150. Other differences are also considered.

The network 202 can include any number of networks of various types, including local area networks, wide area networks, and/or networks of networks, for instance the internet. The VIS 150 is configured for communicating with the server 212 in any suitable fashion, using any suitable protocols. The server 212 is coupled to a datastore 214, which, in some embodiments, may be implemented via common hardware, firmware, and/or software as that implementing the server 212. The server 212 is situated at a remote site 210, though it should be understood that the server 212 need not be located at any specific distance from the VIS 150. In some embodiments, the server 212 is operated by an entity which provides the VIS 150, for instance a supplier, manufacturer, distributor, or other entity responsible for providing the VIS 150 to the entity operating the VIS 150. In some cases, the entity operating the VIS 150 and the entity operating the server 212 are a common entity, though in other cases the VIS 150 is operated by an entity separate from the entity operating the server 212. For example, the VIS 150 is operated by a police force, by a highway regulator, by a parking enforcement organization, or the like, and the server 212 is operated by the company developing the VIS 150, and the remote site 210 is at an establishment owned or operated by the development company.

With additional reference to FIG. 3, the VIS 150 is configured for implementing a method 300 for identifying a categorization of a vehicle, for instance the vehicle 102, depicted in an input image, for instance the input image 120. In some embodiments, the term "category" and related terms, including "categorization", are used to refer to classes of objects which separate objects from one another based on established definitions, so that objects within a common category share certain features or characteristics, and are distinct from objects in a different category based on at least one feature or characteristic. A given category has defined boundaries, which may be set in any suitable fashion, and any number of categories may exist for certain characteristics of objects. In other embodiments, a category may refer to any other suitable subdivision of objects, defined in any suitable fashion. By way of an example, a make and model of the vehicle 102 are two different categories, and one possible categorization of the vehicle 102 is that it is of the Honda make and of the Accord model, or of the Ford make and of the F150 model. By way of another example, a class and size of the vehicle 102 are two other categories, and another possible categorization of the vehicle 102 is that it is of the SUV (sport-utility vehicle) class and of the "mid-size" size, or of the pickup truck class and of the "full-size" size. The categorization of the vehicle 102 may assign it to any number of categories, including, but not limited to, make, model, trim (including modifications from a base model), generation and/or year, class, size, body style, layout, and the like, and can additionally include categorizing the vehicle 102 based on additional features, for instance the presence or absence of a roof rack, fog lights, a spoiler, the type of head, tail, or brake lights, and the like.

In one example implementation, the VIS 150 categorizes the vehicle 102 from the input image 120 to identify one or more of the make, model, generation or year, and trim of the vehicle 102. From this information, the VIS 150 then derives additional categorization data based on known associations between categories: once the make, model, generation or year, and/or trim of the vehicle 102 are identified, the VIS 150 can use categorizations provided by the manufacturer of the vehicle to further categorize the vehicle. For instance, if the vehicle 102 is categorized as a ninth generation Honda Accord Touring, additional categorizations about the class, size, body style, layout, etc. of the vehicle 102 can be obtained from information provided by the manufacturer of the vehicle 102 (which may be obtainable from a resource provided by the manufacturer, or may be replicated therefrom and stored in a database local or otherwise available to the VIS 150, as appropriate). It should be understood that other categorizations are also considered, and fall within the scope of the present disclosure. For instance, manufacturers may offer vehicles in a variety of different colours having trade or branding names associated therewith (e.g., "Midnight Blue", "Powder White", "Inferno Red", etc.). Although numerical representations of a vehicle colour (e.g., an RGB value) exist, one additional categorization of a vehicle could include the trade name of the colour of the vehicle, as defined by the manufacturer of the vehicle, rather than a simple descriptor (e.g., "red", "blue", etc.).

As part of step 310, in some embodiments the method 300 includes selecting, from a plurality of images produced by a camera, for instance the camera 112, at least one image containing the vehicle 102 to serve as the input image 120. In some embodiments, the camera 112 is a video camera producing a video stream composed of a plurality of frames. In such embodiments, one or more input images 120 may be selected and extracted from the video stream. For example, the controller 152 can implement an image preprocessor configured for analyzing the video stream and for selecting one or more frames to serve as input images 120 for use in identifying the categorization of the vehicle 102. In some other embodiments, the camera 112 is a still image camera which acquires multiple images in succession when the vehicle 102 is detected in the field of view 114 of the camera 112. The controller 152, for instance by way of the image preprocessor, can assess the acquired images and identify one or more images to serve as the input images 120.

Step 310 may also include various types of image pre-processing. In some cases, for instance in cases in which a selection of one or more input images 120 is made from a larger collection of images, various types of preprocessing may be performed, including identifying images of higher quality (clearer or less blurry images), images in which a larger portion of the vehicle 102 is visible, for instance using object recognition techniques, images from a particular preferred orientation (e.g., in which the vehicle 102 is depicted from the front, from the rear, etc.), or the like. In some embodiments, a quality threshold may be established for the input images 120, and only images exceeding the quality threshold may be used as input images 120. In some embodiments, images are cropped prior to serving as input images 120, for instance to match a bounding box for the vehicle 102 depicted in the input image. The bounding box may be determined in any suitable fashion, for instance using object recognition techniques of various types. For example, images from camera 112 are provided to the preprocessor which detects the presence of the vehicle 102 in one or more of the images. The preprocessor then crops the images to remove extraneous portions and bound the vehicle, and evaluates the images for quality. This can include determining which images are less blurry, which ones depict more of the vehicle, or depict the vehicle from a preferred orientation, which ones have better lighting, or the like.

As part of step 320, the method 320 includes generating, using a neural network, a feature vector of the vehicle 102 based on the input image 120, for instance using the neural network 154. As will be described in greater detail hereinbelow, the neural network 154 is trained to generate a feature vector when provided with an image of a vehicle, for instance the input image 120 depicting the vehicle 102. A feature vector is a unique or pseudo-unique numerical representation of the vehicle 102 (as depicted in the input image 120), and is based on the general appearance of the vehicle (shape, size, form) and other features of the vehicle. The feature vector may be a multidimensional vector having any suitable number of dimensions and entries, may include values of any suitable range (e.g., normalized values or not), and may be structured in any suitable fashion. The feature vector need not be an intelligible representation of the vehicle; that is to say, the feature vector may not, upon review or evaluation, present an uninitiated person or system with a clear indication of what the vehicle 102 looks like, what features it has, or the like. The feature vector may thus be any suitable numerical representation of the vehicle 102 as depicted in the input image 120.

The feature vector produced by the neural network 154 may be provided to the controller 152 in any suitable fashion, and may, in some cases, be stored in the datastore 156 (whether by the neural network 154 itself, or by the controller 152). Additionally, as noted above, in some embodiments a feature vector generated by the neural network (e.g., for a given vehicle 102 depicted in an input image 120) may be unique, for instance functionally unique, insofar as it may be highly improbable or impossible for two identical input images 120 to be obtained separately. In some other embodiments, a feature vector generated by the neural network may be pseudo-unique, insofar as it may be possible for different input images 120 depicting vehicles 102 of the same categorization (i.e., same make, model, generation, etc.) to result in identical or near-identical feature vectors when provided to the neural network 154. In any case, the neural network 154 is configured to generate feature vectors in such a fashion that vehicles 102 depicted in separate input images 120 which have different categorizations result in different feature vectors, and vehicles 102 depicted in separate input images which have similar or identical categorizations result in similar or identical feature vectors.

As will be described in greater detail hereinbelow, the feature vector for the vehicle 102 may be compared against vectors of known vehicles, referred to herein as "reference vectors". Reference vectors, much like the feature vector generated as part of step 320, are numerical representations of known vehicles as depicted in images, referred to as reference images. Because the vehicles in the reference images are known, reference vectors may be stored in conjunction with categorization information for the vehicles they relate to; thus, a reference vector generated from a reference image which depicts a Honda Accord may be stored in association with categorization information for the Honda Accord, including, for instance, the make, model, trim, and generation of the vehicle, information about the class and size of the vehicle (i.e., as provided by the manufacturer), information about other features of the vehicle, and the like. In some embodiments, different reference vectors may be produced for different orientations of the known vehicles, that is to say, using multiple reference images which depict a given one of the known vehicles from different orientations. Additionally, in some embodiments multiple different reference vectors for a same known vehicle, even from a same orientation, may also be included in the library 160, as appropriate. The VIS 150 is provided with the library 160 of reference vectors and related information, which may be stored in the datastore 156 and/or available over the network 202, for instance via the server 212.

As part of step 330, in some embodiments the method 300 includes determining an orientation of the vehicle 102, based on the input image 120. The orientation of the vehicle refers to the heading or positioning of the vehicle as depicted in the input image 120. For example, in one input image 120, the vehicle 102 may be depicted from the front (i.e., head-on), and thus the orientation of the vehicle 102 is determined to be a front orientation. In another example, the vehicle 102 may be depicted in the input image from the driver's side, and thus the orientation of the vehicle is determined to be a driver-side orientation. Other example orientations include passenger-side, rear, overhead, as well as interstitial orientations, for instance front-right (or front-driver), front-left (or front-passenger), rear-right (or rear-driver), rear-left (or rear-passenger), or the like. In one example implementation, the orientation of the vehicle is either one of a front-facing orientation and a rear-facing orientation, based on the general lengthwise symmetry of most vehicles. In some embodiments, after generating the feature vector as part of step 320 and determining the orientation as part of step 330, the controller 152 may cause the feature vector and/or the orientation to be stored in the datastore 156, for instance as metadata for the input image 120, which may also be stored in the datastore 156.

The orientation of the vehicle 102 can be determined in any suitable fashion: in some embodiments, a discriminator or classifier neural network, or other image analysis system, is used to determine the orientation of the vehicle 102. The input image 120 can be provided to the image analysis system, which in turn outputs an indication of the orientation of the vehicle 102. In some other embodiments, the orientation of the vehicle 102 as depicted in the input image 120 may be determined from the physical configuration of the camera 112 which captured the input image. For example, a camera 112 located on a gantry over a highway faces a particular direction relative to the flow of traffic on the highway: the camera 112 may face oncoming traffic, thereby acquiring images of vehicles 102 in a front or overhead-front orientation. By way of another example, a camera located at a ticket booth of a parking garage facing the entrance to the parking garage acquires images of vehicles 102 in a particular orientation, for instance a front, front-driver, or front-passenger orientation. In cases in which the position of the camera 112 is fixed relative to vehicles 102 for which input images 120 may be acquired, the orientation of the vehicle 102 within the input image 120 may be predetermined on this basis. For example, a camera 112 known to acquire images of vehicles 102 in a rear orientation can include, within metadata for the images, the orientation of the vehicles when providing the images to the VIS 150. In another example, the VIS 150 has access to, for instance within the datastore 156, records indicating expected orientations of vehicles 102 depicted in input images 120 received from one or more of the cameras 112, and assigns those expected orientations to the input images 120 upon receipt.

There may be situations in which a vehicle 102 is depicted in an input image with an orientation different from that which is expected based on the physical configuration of the camera 112 (for instance, a vehicle 102 performing an illegal manoeuvre or the like). This may be determined, for example, when the method 300 fails to identify the categorization of the vehicle 102 using the input image 120, due to a systematic validation of the expected orientation (determined based on the physical configuration of the camera 112), or in any other suitable fashion. In such cases, the input image 120 may additionally be flagged for depicting a vehicle 102 performing an illegal manoeuvre, and optionally transmitted to a regulatory body responsible for road safety. Additionally, the VIS 150 may change the orientation of the vehicle 102 determined based on the physical configuration of the camera 112 to the actual orientation as determined from the input image 120 itself, as appropriate.

As part of step 340, the method 300 includes selecting a set of reference vectors from a library of reference vectors, for instance the library 160, in some embodiments based on the orientation of the vehicle 102 as depicted in the input image 120. As noted hereinabove, the datastore 156 can be used to store the library 160 of reference vectors, and/or the library of reference vectors can be accessible to the VIS 150 via the server 212 (e.g., the library 220 of reference vectors can be stored in the datastore 214.). The controller 152 is configured for selecting a set of reference vectors from the library 160, 220 of reference vectors to be used as points of comparison for the feature vector of the vehicle 102. The set of reference vectors may be selected based on logic or other rules in the programming of the VIS 150, based on user input, or in any other suitable fashion, for instance as laid out hereinbelow. The set of reference vectors, once selected, may be temporarily stored in a volatile memory of the VIS 150, or may be stored in a non-volatile memory in some fashion, for instance in the datastore 156 as pointers or symbolic links. Other approaches for retaining the selected set of reference vectors are also considered.

In embodiments in which the set of reference vectors is selected based on logic or other rules within the programming of the VIS 150, various approaches are considered. In some embodiments, the selected set of reference vectors corresponds to those reference vectors from the library 160, 220 being associated with the same orientation as that of the vehicle 102 as depicted in the input image 120. This may serve to limit the number of comparisons performed, as the feature vector is compared to fewer reference vectors, thereby potentially reducing the amount of time and resources required to perform the comparisons. In some other embodiments, the selected set of reference vectors is composed of those reference vectors from the library 160, 220 which are of the same orientation as that of the vehicle 102 as depicted in the input image 120 and of adjacent orientations. For example, for an input image 120 depicting the vehicle 102 from the front-right, the selected set of reference vectors is composed of front reference vectors, front-driver reference vectors, and driver-side reference vectors. In some further embodiments, for instance in cases in which the library 160, 220 does not have orientation-specific reference vectors, or lacks reference vectors for certain orientations of certain known vehicles, the selected set of reference vectors may include the totality of the reference vectors in the library 160, 220. For example, if a first comparison with a subset of the reference vectors from the library 160, 220 fails to identify a close match (as will be described in greater detail hereinbelow) for the feature vector, a second comparison can be performed using the totality of the reference vectors in the library 160, 220. Other approaches for selecting the set of reference vectors are also considered.

As part of step 350, the method 300 includes identifying at least one close match reference vector by comparing the feature vector of the vehicle 102 to a plurality of reference vectors. The plurality of reference vectors may be the selected set of reference vectors from the library 160, 220 (as per step 340), or any other suitable collection of reference vectors, as described in greater detail hereinbelow. A close match can be any one of the reference vectors which is sufficiently similar to the feature vector. In some embodiments, a reference vector is considered a close match for the feature vector when a distance between the reference vector and the feature vector is less than a predetermined threshold distance. Because both the feature vector and the reference vector are vectors (i.e., the mathematical construct defining a quantity by way of both a direction and a magnitude), the distance between the feature vector and the reference vectors can be evaluated in multiple different fashions. By way of an example, the distance between the feature vector and the reference vectors is a Euclidean distance, defined as the smallest distance between points, or pairs of points, of the vectors. By way of another example, the distance between the feature vector and the reference vectors is evaluated in other fashions, for instance based on projections of the feature vector onto the different reference vectors. In some other embodiments, a reference vector is considered a close match for the feature vector when the reference vector is the one closest to the feature vector. Other approaches for assessing close matches and for determining distances between the feature vector and the reference vectors are also considered.

In some embodiments, the plurality of reference vectors includes at least the reference vectors of the set of reference vectors selected at part of step 340. In some other embodiments, the plurality of reference vectors may include the totality of the reference vectors of the library 160, 220, a predetermined subset of the reference vectors of the library 160, 220, the selected set of reference vectors and some additional reference vectors, and the like. By way of an example, the set of reference vectors may be selected based on the orientation of the vehicle 102 as depicted in the input image 120, and the reference vectors used in the comparison performed as part of step 350 may include the selected set of reference vectors as well as reference vectors of adjacent orientations. Other approaches are also considered.

As part of step 360, the method 300 includes outputting an indication of the categorization of the vehicle 102 based on the at least one close match reference vector. Because the feature vector and the reference vectors are numerical representations of vehicles, reference vectors which are close matches for the feature vector are understood to indicate that the known vehicles represented by the close match reference vectors share at least some of the same categorizations with the vehicle 102 depicted in the input image 120 which produced the feature vector. Put differently, depending on the distance between the close match reference vector(s) and the feature vector, the known vehicle(s) represented by the close match reference vector(s) and the vehicle 102 represented by the feature vector share some or all of their categorizations. As a result, the categorization(s) of the vehicle represented by the close match reference vector are determined to be categorization(s) of the vehicle 102 represented by the feature vector.

The indication, for instance output by the VIS 150, can include any suitable number of categorizations. By way of an example, the indication can include make and model categorizations (e.g., Honda Accord). By way of another example, the indication can include additional categorizations, including generation (e.g. ninth, 2012-2017, etc.) and/or year (2016, 2017, 2018, etc.), trim (Sport, Touring, etc.), in some cases including a list of modifications relative to a base model, class (compact, mid-size, coupe, sedan, etc.), body style (two-door, four-door, hatchback, etc.), layout (front-wheel drive, rear-wheel drive, all-wheel drive), powertrain (engine capacity, internal combustion vs. electric, transmission type, etc.) and the like. Other implementations are also considered, in which any suitable number of categorizations are included in the indication. In some embodiments, the indication can also include a degree of confidence that the vehicle 102 depicted in the input image 120 corresponds to the close match. The degree of confidence may be expressed as a percentage (e.g., 95% confidence), as a fractional or other numerical value (e.g., $9/10$ or 0.90 confidence), or in any other suitable fashion.

In some embodiments, as part of step 350, the VIS 150 may identify a single close match reference vector. In such embodiments, the indication can include all known categorizations of the vehicle associated with the close match reference vector, or a predetermined subset thereof, for instance based on preferences established by the operator of the VIS 150. In some other embodiments, as part of step 350, the VIS 150 may identify multiple close match reference vectors. In some such embodiments, the indication can include all known categorizations of the different vehicles associated with each of the close match reference vectors, or a predetermined subset thereof, for instance based on preferences established by the operator of the VIS 150. Alternatively, in some such embodiments, the indication can include a first portion relating to common categorizations shared by the different vehicles associated with each of the close match reference vector, and second portion relating to differing categorizations. For example, if the VIS 150 has identified three close match reference vectors, the first portion of the indication can indicate that all three close matches are Honda Accord vehicles of a given generation, and the second portion can indicate that one close match is the Sport trim from 2018, that another close match is the Sport trim from 2019, and that a further close match is the Touring trim from 2018.

The indication may be output by the VIS 150 to one or more output devices, as appropriate. In some embodiments, the VIS 150 outputs the indication to the interface 118, for instance to the display 116, for presentation to the operator of the VIS 150. The indication can be provided to the interface 118 in any suitable format, for instance for presentation via a graphical user interface (GUI) on the display 116. In some other embodiments, the VIS 150 stores the indication in the datastore 156 using an output from the controller 152. In some other embodiments, the VIS 150 may output the indication over the network 202 to the server

212, for instance for storage in the datastore 214 and/or for presentation to an operator at the remote site 210. In still further embodiments, the indication may be output to any other suitable device.

The neural network 154, having been trained to generate numerical representations of vehicles based on images thereof, provides a common framework for comparing different vehicles. In this fashion, the feature vector of a vehicle having unknown categorizations can be compared to the reference vectors of known vehicles having known categorizations. A close match between the feature vector and one or more of the reference vectors indicates commonalities between the vehicles represented thereby, namely that the vehicle represented by the feature vector shares some or all of its categorizations with the vehicle represented by the one or more close match reference vectors. As a result, an unknown vehicle can be identified, by way of one or more of the categorizations to which it belongs, by comparing the feature vector to the library 160, 220 of reference vectors and identifying close matches therebetween. In addition, because the neural network 154 does not identify vehicles itself, and instead generates the feature vectors, there is no need to retrain the neural network 154 to improve its functionality, for instance to increase the number of vehicles the VIS 150 can identify. Instead, the same neural network (or a different instantiation of the same neural network, for example implemented by the server 212) can be used to generate new reference vectors from new reference images of new vehicles. The new reference vectors can then be associated with the categorizations for the new vehicles, for instance using user-submitted information and/or information obtained from the manufacturers of the new vehicles, and be used to update the library 160, 220 of reference vectors. In this fashion, the vehicle identification functionality of the VIS 150 can be improved or updated without costly and time-consuming retraining of the neural network 154.

Figure 4A:
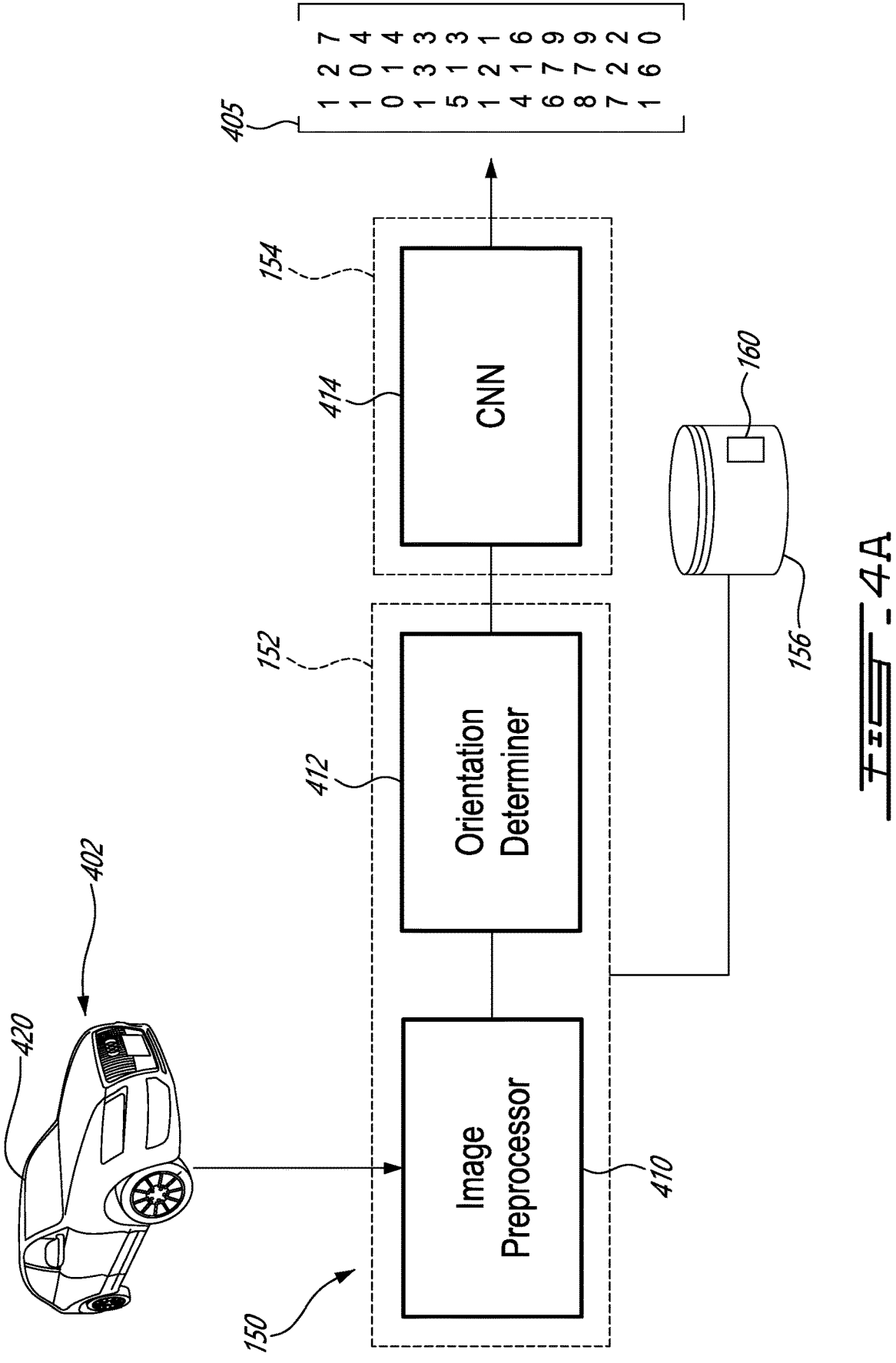
FIGS. 4A-B are schematic diagrams illustrating example implementations of certain steps of the method of FIG. 3.
Figure 4B:
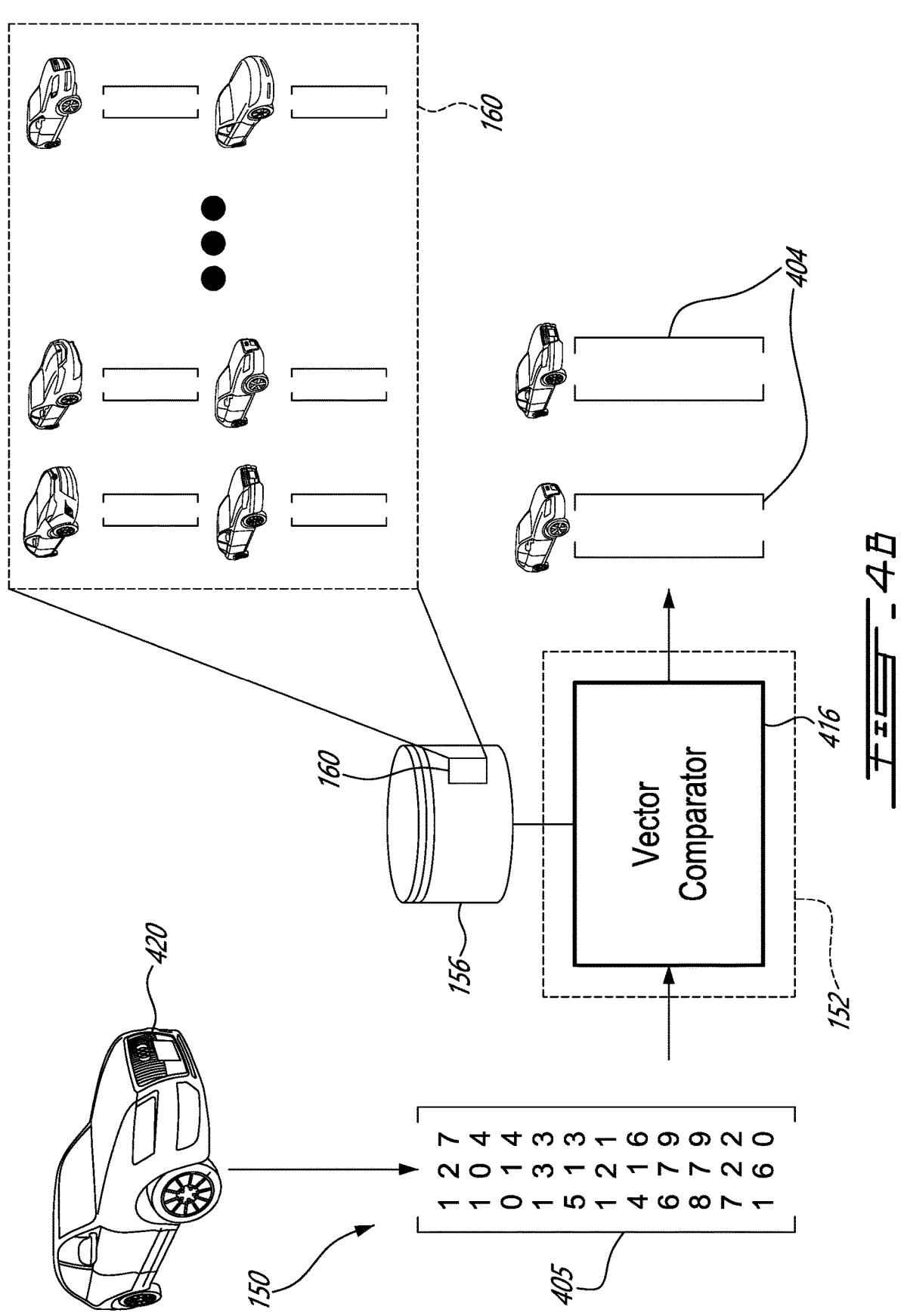

With reference to FIGS. 4A-C, an example vehicle identification process is illustrated, in which an example implementation of the VIS 150 is presented. The example implementation of the VIS 150 should not be understood to be limiting in any capacity, and instead represents one example implementation. In FIG. 4A, an example input image 420, depicting an unknown vehicle 402, is provided as an input to the VIS 150, for instance to the controller 152. In this example implementation, the input image 420 is first obtained by an image preprocessor 410, which performs various quality checks on the input image 420 and/or performs various transformations of the input image 420. For example, the image preprocessor 410 crops the image to remove extraneous portions thereof (e.g., portions of the image depicting other vehicles, backgrounds, and the like), sharpens the image, changes the contrast, colour balance, and the like, and/or performs any other transformations. In some cases, the image preprocessor 410 performs transformations to achieve a particular standardized format or other type of normalization for the input image 420. In other implementations, the VIS 150 may not include an image preprocessor 410, and the input image 420 may be used substantially "as-is", that is to say, as obtained from the camera 112.

The image preprocessor 410 then provides the input image 420, in some embodiments as modified by the image preprocessor 410, to an orientation determiner 412. The orientation determiner 412 may include a discriminator or classifier neural network, or other system capable of determining the orientation of the vehicle 402 as depicted in the input image 420. Once the orientation of the vehicle 402 is determined, the orientation determiner 412, or another element of the VIS 150, may store an indication of the determined orientation of the vehicle 402 in association with the input image 420. For example, the indication of the orientation of the vehicle 402 may be stored within the metadata of the input image 420. By way of another example, the indication of the orientation of the vehicle can be stored in the datastore 156, for instance in association with the input image 420. In some embodiments, for instance embodiments in which the orientation of the vehicle 402 is known or expected from the orientation of the camera 112 acquiring the input image 420, the orientation determiner 412 may be omitted, or may acquire the expected orientation, as described hereinabove. The input image 420 is then provided to the neural network 154, which in this example implementation is a convolutional neural network (CNN) 414. The CNN 414 obtains the input image 420 and produces a feature vector 405. The feature vector 405 is an example, and it should be understood that the numerical values, as well as the overall structure, is not necessarily indicative of other implementations.

In FIG. 4B, the feature vector 405 is provided from the neural network 154 to the controller 152, for instance to a vector comparator 416 forming part of the controller 152. The vector comparator 416 performs a comparison between the feature vector 405 and the library 160 of reference vectors. In the illustrated example, the library 160 is stored in the datastore 156, and thus is locally available to the VIS 150. The controller 152 is coupled to the datastore 156 and can request therefrom the selected set of reference vectors, then compare the feature vector 405 thereto. For instance, the vector comparator 416 can use the orientation of the vehicle 402 as depicted in the input image 420 to select reference vectors from the library 160 having the same or similar orientations. In other examples, the library 160 may be remote from the VIS 150 and accessible over the network 202, for instance the library 220 accessible via the server 212. The vector comparator 416 can perform the comparisons between the feature vector 405 and the selected set of reference vectors in any suitable fashion, and output one or more close match reference vectors 404.

In FIG. 4C, example entries of a categorization database 460 are illustrated. The categorization database 460 stores therein the library 160 of reference vectors, as well as categorization information for the various known vehicles represented by the reference vectors of the library 160. As noted hereinabove, the categorization information can relate to any number of categorizations: in the illustrated example of FIG. 4C, the categorization database is shown as storing information relating to the categorizations of make, model, generation, class, size, and other features. In other embodiments, fewer or more categorizations may be stored. In some embodiments, the categorization database 460 is stored locally to the VIS 150, for instance in the datastore 156. In this fashion, the library 160 of reference vectors is also available locally to the VIS 150. In some other embodiments, the categorization database 460 is stored remotely from the VIS 150, for instance at the remote site 210 in the datastore 214. The VIS 150 can access the categorization database 460 via the network 202 and thereby obtain the categorization information stored therein, as well as the reference vectors of the library 220. In some further embodiments, part of the categorization database 460 is stored locally to the VIS 150, and another part or all of the categorization database 460 is stored remotely from the VIS 150, for instance at the remote site 210. For example, the library 160 is stored locally in the datastore 156, and the categorization database 460, including the categorization information, is stored remotely in the datastore 214 at the remote site 210. In this example, the VIS 150 can identify close match reference vectors using the library 160, then queries the server 212 to obtain categorization information. This particular implementation may rely on user input from an operator of the VIS 150 to fetch categorization information: for example, the VIS 150 identifies close matches for every input image 120 it obtains, and fetches categorization information via the server 212 in response to user input indicating a desire to see categorization information for one or more selected vehicles, as depicted in the input images 120. Other approaches are also considered.

Figure 5:
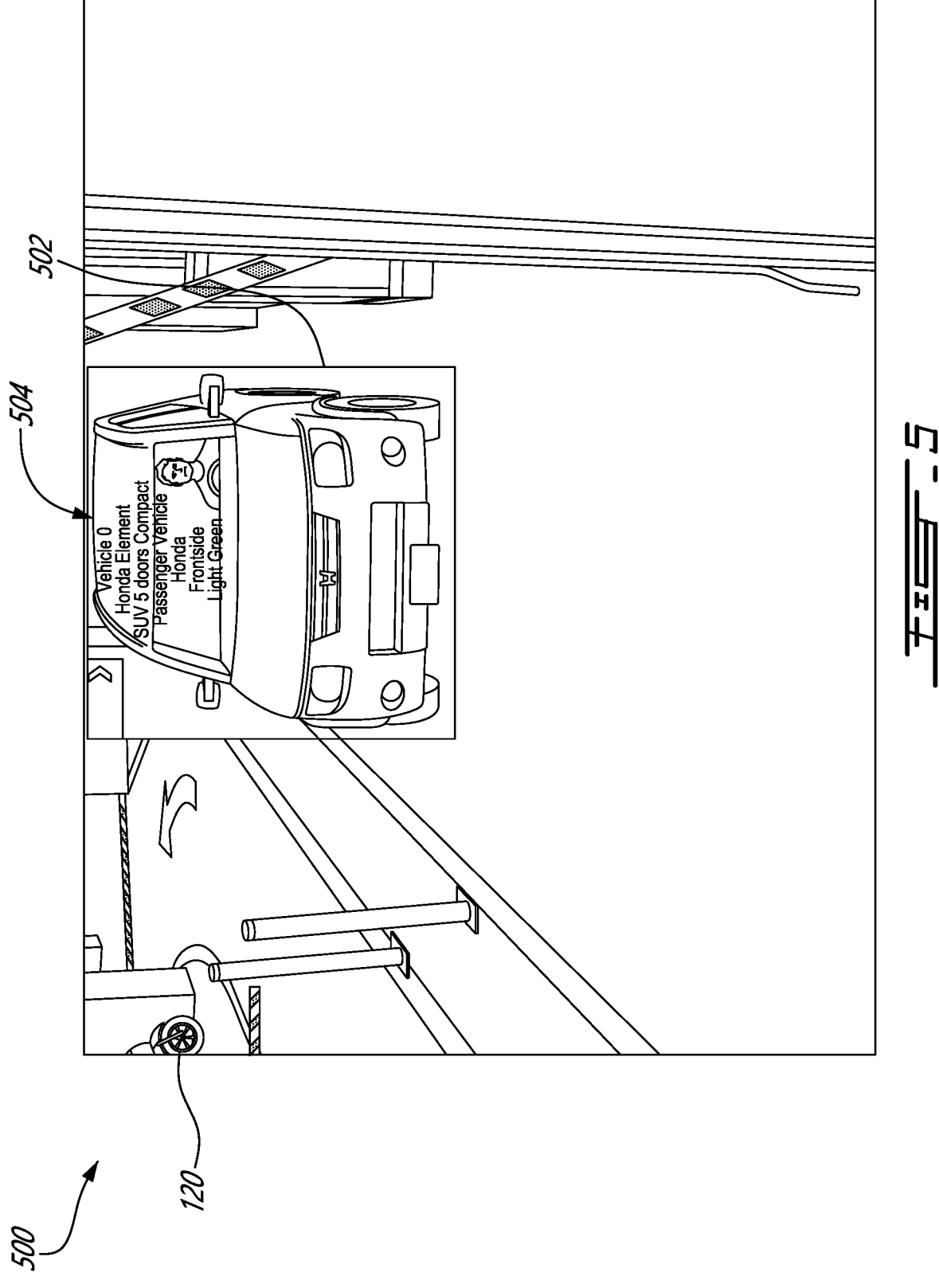
FIG. 5 is an example graphical user interface of the vehicle identification system of FIG. 2.

With reference to FIG. 5, an example GUI 500 of the VIS 150 is illustrated, which may be presented or otherwise displayed via any suitable display device, for instance the display 116. In this example, the GUI 500 presents the input image 120, in which a vehicle is depicted. The GUI 500 displays a bounding box 502, which delimits the contours of the vehicle to indicate to an operator viewing the GUI 500 that the VIS 150 has identified a vehicle in the input image 120. Within the bounding box 502 is presented categorization information 504 as a series of lines of text. In the example of FIG. 5, the categorization information 504 includes the make and model of the vehicle ("Honda", "Honda Pilot"), the vehicle class ("SUV"), the vehicle body style ("5 doors"), the vehicle size ("Full Size"), and the vehicle body style ("crossover"), though in other examples, fewer or additional categorizations may be presented. When multiple vehicles are present in the input image 120, multiple bounding boxes 502 with associated categorization information 504 may be displayed, or a single vehicle within the input image 120 may be selected for identification, resulting in a single bounding box 502 and associated categorization information 504. For instance, the selected vehicle is the vehicle which occupies the largest or most central portion of the input image 120, the vehicle which is the best lit within the input image 120, or the like.

Although shown here as a still image, in some embodiments a video feed is presented, from which one or more input images 120 are extracted, as described in greater detail hereinabove. In such embodiments, the bounding box 502 and the categorization information 504 within the GUI 500 moves as the vehicle moves, tracking the vehicle and ensuring that the bounding box 502 continues to delimit the contours of the vehicle, and that the categorization information 504 continues to be displayed in a superimposed fashion over the vehicle. In some other embodiments, the categorization information 504 may be displayed next to the bounding box 502, for instance within a text bubble or other GUI element, as appropriate. In some further embodiments, the categorization information 504 may be located in another portion of the GUI 500 separate from the input image 120, to avoid obscuring portions of the input image 120. For instance, the GUI 500 may display the input image 120 or a video feed from a camera 112, and in response to the operator moving a cursor or other pointing element over a vehicle depicted in the input image 120 or the video feed, display the bounding box 502 around the vehicle in question. A separate portion of the GUI 500, outside the input image 120 or the video feed, can then present the categorization information 504. Other approaches for the GUI 500 are also considered, and the examples described herein should not be considered limiting.

With reference to FIG. 6, a training methodology 600 for training a neural network is illustrated. The training methodology 600 may be used, for instance, to train the neural network 154 and/or the CNN 414 of the VIS 150. It should be noted that various elements of the training methodology 600 may also be used as part of the VIS 150, as appropriate. In some embodiments, the neural network 154 and/or the CNN 414 are implemented as a Siamese neural network, in which two (or more) neural networks with identical parameters and weights are used, for instance to identify similarities between two inputs. The neural network 154 and/or the CNN 414 may be used to produce feature vectors, such as those described hereinabove, based on an input image. As part of this training methodology, an example CNN 602 (which may, once trained, serve as the neural network 154 and/or the CNN 414) is provided with successive pairs of images present in a corpus of images. In the illustrated example, the CNN 602 is provided with two images 612, each depicting a vehicle (which may be of the same type of vehicle, or images of different types of vehicles). The CNN 602 is provided with the pairs of images to teach the CNN 602 to determine whether the images 612 depict the same vehicle or different vehicles. Put differently, the CNN 602 is taught to determine whether the vehicles depicted in the images 612 share categorizations (e.g., same make, model, trim, generation, etc.).

The CNN 602 produces an output based on analysis of the images 612, in the form of feature vectors 605. The feature vectors 605 may be of any suitable type and format, and are provided to a connection function 604. The connection function 604 serves to evaluate a distance (e.g., in multidimensional space) between the feature vectors 605, or between proxy representations thereof, using any suitable kind of differentiable distance function. In some embodiments, the connection function 604 evaluates an Euclidian distance between the feature vectors 605; in some other embodiments, the connection function 604 evaluates a cosine distance between the feature vectors 605. Still other approaches for evaluating the distance between the feature vectors 605 are considered. The cost function 606 serves to evaluate the amount of error of the CNN 602 in respect of the feature vectors 605, and may employ any suitable function for evaluating the relationship between the features vectors 605. In training, the CNN 602 is reinforced to produce feature vectors 605 for which the distance therebetween is low when the images 612 depict the same vehicle, and the distance therebetween is high when the images 612 depict different vehicles. Depending on the embodiment, the cost function 606 may be implemented in different fashions, including triplet loss, center loss, contrastive loss, or the like. Together, the connection function 604 and the cost function 606 provide feedback to the CNN 602 to adjust its functionality to assess whether the vehicles in the images 612 are the same or not. Although the training methodology 600 is shown here as training a CNN, it should be noted that other types of neural networks may be used as part of the VIS 150, and that the training methodology 600 may be used to train other types of neural networks.

Because the neural network 154 of the VIS 150, for instance as embodied by the CNN 414, is trained to generate vectoral representations of vehicles depicted in images (i.e., feature vectors), the neural network 154 need not be retrained in order to detect new vehicles. Put differently, when new vehicles are released by vehicle manufacturers, the neural network 154 may be used as-is to generate feature vectors from input images 120 depicting the new vehicles. When a comparison of the feature vector of a particular new vehicle results in no close matches with the reference vectors of the library 160, 220, the VIS 150 can recognize the vehicle of the particular input image 120 as an unknown vehicle. The VIS 150 may then flag to an operator of the VIS 150 that the vehicle is unknown and/or transmit an indication of an unknown vehicle to the server 212 at the remote site 210, in order to alert the entity which supplies, manufactures, distributes, or is otherwise responsible for the VIS 150 of the unknown vehicle. The indication may include the particular input image 120, other contextual information relating to the input image 120, one or more potential categorizations (e.g., the closest matching reference vectors, even if these reference vectors were not considered sufficiently close to qualify as close matches), and any other relevant information. For example, the indication may flag the input image depicting the unknown vehicle for evaluation by personnel of the entity providing the VIS 150, for instance within a database (e.g., within the datastore 214) associated with the server 212.

With reference to FIG. 7, there is illustrated a method 700 for updating a vehicle identification system, for instance the VIS 150. The updating performed as part of the method 700 is one fashion for updating the VIS 150, and other types and fashions of updating are also considered. In some embodiments, part or all of the method 700 is performed by the VIS 150 itself, thereby provisioning the VIS 150 with the ability to self-update. In some other embodiments, part or all of the method 700 is performed by the server 212 or similar computing device operated by the entity responsible for providing the VIS 150. In some further embodiments, the method 700 is performed in part by both the VIS 150 and the server 212, as appropriate.

As part of step 710, the method 710 includes, depending on whether the method 700 is performed by the VIS 150 or by the server 212, providing or operating a vehicle identification system, for instance the VIS 150. The VIS 150 has functionality to identify a categorization of a first plurality of vehicles from an input image depicting a vehicle of the first plurality of vehicles by generating, using a neural network, a feature vector based on the input image and by comparing the feature vector to at least part of a library of reference vectors based on an orientation of the vehicle to identify at least one close match reference vector, wherein said identifying the categorization includes providing an indication of the categorization of the vehicle depicted in the input image based on the at least one close match reference vector. For instance, the first plurality of vehicles corresponds to the vehicles for which reference vectors are included in the library 160, 220; the input image is the input image 120 and/or 420; the neural network is the neural network 154 and/or the CNN 414; the library of reference vectors is the library 160, 220; and the like. In some embodiments, the VIS 150 is provided by the entity responsible for VIS 150, for instance the supplier, developer, maintainer, manufacturer, or the like. In some other embodiments, the VIS 150 is provided by a third-party which may have a relationship with the responsible entity, but is distinct therefrom, for instance a distributor. In some embodiments, operating the VIS 150 involves causing program instructions which implement the VIS 150 to be executing on a computing device, which may be any suitable computing device, for instance one coupled to the interface 118.

As part of step 720, in some embodiments the method 700 includes obtaining an additional input image depicting an additional vehicle which is absent from the first plurality of vehicles; that is to say, the vehicle depicted in the input image is one for which no reference vector exists in the library 160, 220 of reference vectors. The additional vehicle may be a newly released model, an uncommon or rare vehicle for which few images presently exist, or any other type of vehicle for which a reference vector is not present in the library 160, 220. In some embodiments, the additional input image is obtained by the camera 212, for instance as part of the normal operations of the client site 110 and the VIS 150. In some other embodiments, the additional input image is obtained by the entity responsible for the VIS 150, for instance the developer or the like, as part of the responsible entity's usual operations, or as provided by another client of the responsible entity, which may operate a separate VIS and one or more cameras. In other embodiments, the additional input image may be obtained in any other suitable fashion.

In some embodiments, obtaining the additional input image occurs when the VIS 150 determines that a particular input image depicts a vehicle unknown to the VIS 150, that is to say, for which a reference vector is not present in the VIS 150. For example, the VIS 150 determines that the particular input image depicts an unknown vehicle based on failing to find a close match reference vector: the VIS 150 can generate a feature vector for the unknown vehicle based on the additional input image and compare it to the reference vectors of the library 160, 220. In one instance, failing to find a reference vector which is less than a predetermined distance from the feature vector of the unknown vehicle leads to a determination that the vehicle is unknown. In another instance, the VIS 150 determines that the additional input image depicts an unknown vehicle based on a ratio of two distances: the first distance being the distance between the feature vector of the unknown vehicle and one of the reference vectors, and the second distance being the distance between the feature vector of the unknown vehicle and a second one of the reference vectors. In this case, the first and second reference vectors may be the closest matches from amongst the reference vectors of the library: if the feature vector of the unknown vehicle is found to not be particularly close to either of the two closest matches, that may be indicative of the vehicle being an unknown vehicle. Other approaches for determining that a particular input image depicts an unknown vehicle are also considered.

As part of step 730, the method 700 includes obtaining at least one additional reference vector associated with the at least one additional vehicle absent from the first plurality of vehicles (i.e., the vehicle for which no reference vector exists in the library 160, 220). In some embodiments, obtaining the at least one additional reference vector is performed in response to obtaining the additional input image, as part of step 720. In embodiments in which the method 700 is performed by the VIS 150, the VIS 150 may obtain the additional reference vector(s) from the server 212 (i.e., from the entity responsible for the VIS 150), or may generate the additional reference vector(s) itself. In embodiments in which the VIS 150 obtains an additional reference vector from the server 212, the server 212 may include categorization information along with the additional reference vector. The server 212 may implement its own version of the neural network 154 and/or the CNN 414 to generate the additional reference vector. In embodiments in which the VIS 150 generates the additional reference vector itself, the VIS 150 can provide the additional input image depicting the unknown vehicle to the neural network 154 (or the CNN 414, depending on the implementation) to generate the additional reference vector. The VIS 150 may prompt an operator of the VIS 150 to provide categorization information for the unknown vehicle, or may transmit the additional reference vector to the server 212 with an indication of the unknown vehicle (which may include the additional input image, other contextual information, or the like). In any case, because the neural network 154 and the CNN 414 are used to generate feature vectors, either can also be used to generate new reference vectors, without any retraining of the neural network 154 or the CNN 414 required.

As part of step 740, the method 700 includes updating the library of reference vectors, for instance either or both the library 160, 220, to include the at least one additional reference vector thereby updating the functionality of the vehicle identification system to identify a categorization of the at least one additional vehicle. Because the neural network 154 or the CNN 414 is used to generate feature vectors, the updating of the library 160, 220 updates the functionality of the VIS 150 without retraining the neural network 154 or the CNN 414. In embodiments in which the VIS 150 maintains the library of reference vectors within the datastore 156 (i.e., the library 160), the VIS 150 can directly update the library 160, whether the additional reference vector is obtained from the server 212 or generated within the VIS 150. In embodiments in which the library of reference vectors is maintained by the server 212 at the remote site 210 (i.e., the library 220), the server 212 may cause the library 220 within the datastore 214 to be updated once the additional reference vector is generated by the server 212, or once the additional reference vector is received at the server 212 from the VIS 150.

As part of step 750, when the method 700 is implemented at least in part by the VIS 150, in some embodiments the method 700 includes identifying, with the VIS 150, a subsequent vehicle sharing at least one categorization with the additional vehicle and depicted in a subsequent input image on the basis of the updated library 160, 220 of reference vectors without retraining the neural network 154 (or the CNN 414). As noted hereinabove, the functionality of the VIS 150 can be updated without retraining the neural network 154 or the CNN 414; by updating the library 160, 220 with additional reference vectors, the VIS 150 can be updated to identify new vehicles. When a subsequent vehicle sharing categorization(s) with the additional vehicle (e.g., a vehicle of the same make, model, trim, generation, etc. as the unknown vehicle) is later depicted in a subsequent input image, the VIS 150 can identify the subsequent vehicle by comparing the feature vector of the subsequent vehicle to the reference vector generated in response to failing to identify the unknown vehicle.

Figure 8:
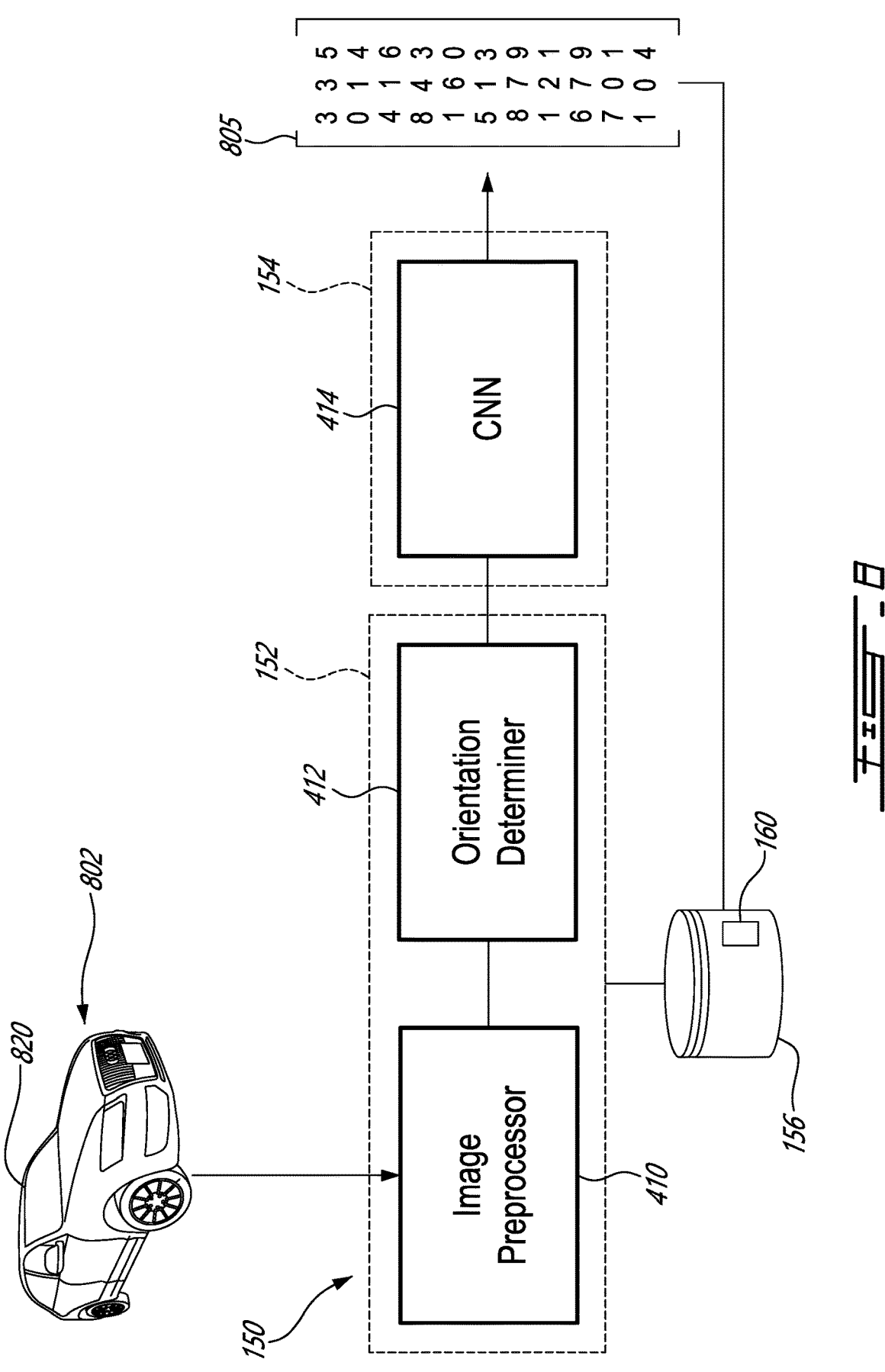
FIG. 8 is a schematic diagram illustrating an example implementation of certain steps of the method of FIG. 7.

With additional reference to FIG. 8, an example implementation of certain steps of the method 700, when performed by the VIS 150, is depicted. An input image 820, depicting an unknown vehicle 802, is provided to the VIS 150. The VIS 150 processes the input image 820 similarly to any other input image, as described hereinabove: the input image 820 is preprocessed by the image preprocessor 410, then an orientation of the vehicle 802 depicted in the input image 820 is determined by the orientation determiner 412. The input image 820, in some embodiments as modified by the image preprocessor 410, is provided to the CNN 414. The CNN 414 produces a vector 805, which acts as a reference vector for the vehicle 802. The reference vector 805 is then stored within the datastore 156. Categorization information for the vehicle 802 can be provided by an operator of the VIS 150, or a query may be sent to the server 212 to flag the input image 820 for review by the entity responsible for the VIS 150, in order to provide categorization information for the vehicle 802.

Figure 9A:
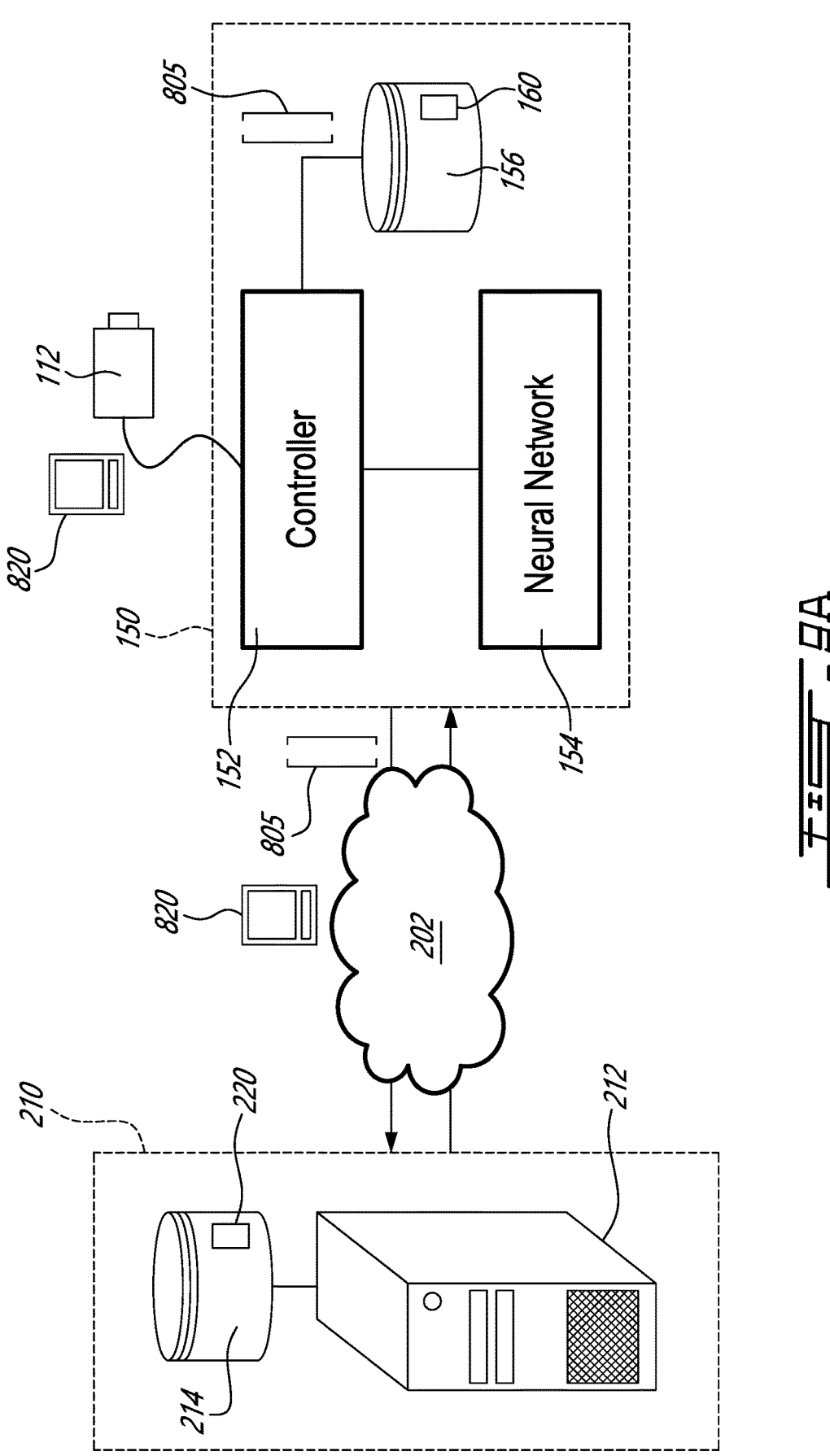
FIG. 9A is a schematic diagram illustrating the vehicle identification system of FIG. 2 performing an example implementation of certain steps of FIG. 7.

With additional reference to FIG. 9A, the reference vector 805 and, in some embodiments, the input image 820 can be provided to the server 212 over the network 202, with an indication that an unknown vehicle 802 has been detected by the VIS 150. The server 212 stores the reference vector 805 and the input image 820 within the datastore 214, in some cases with a flag for review by personnel of the entity responsible for providing the VIS 150. When categorization information for the vehicle 802 is ascertained, the categorization information can be stored within the datastore 214, for instance as part of the categorization database 460 maintained within the datastore 214, and in some cases is also provided to the VIS 150 for updating of the categorization database maintained by the VIS 150 within the datastore 156. Although the embodiment depicted in FIGS. 8 and 9A (and the related disclosure herein) describes an embodiment in which the VIS 150 generates the reference vector 805, it should be understood that in other embodiments, the VIS 150 may provide the input image 820 to the server 212 alongside an indication that the vehicle 802 is unknown, and then obtain the reference vector 805 and, in some cases, associated categorization information from the server 212 once the server 212 has generated the reference vector and obtained the categorization information. Other embodiments are also considered.

Thus, by way of an example, upon determining that a particular input image depicts an unknown vehicle (i.e., the vehicle 802), the VIS 150 transmits the input image to the server 212 over the network 202. The server 212 then produces the reference vector 805 for the vehicle 802 based on the input image and/or based on additional image depicting the same vehicle. Categorization information for the vehicle 802 can be obtained by personnel operating the server 212 or otherwise affiliated with the entity operating the server 212 (i.e., the entity responsible for providing the VIS 150), which may include categorization information submitted by the personnel themselves and/or based on information provided by the manufacturer of the vehicle 802 depicted in the particular input image. The server 212 then transmits the reference vector 805 and the associated categorization information for the vehicle 802 to the VIS 150, which can update the library 160 to include the new reference vector 805 and categorization information, as described in greater detail hereinbelow.

With continued reference to FIGS. 7 to 9A, in one example implementation, the VIS 150 is provided for use in identifying specialty vehicles: this may include small recreational vehicles or pleasure craft (e.g., golf carts, all-terrain vehicles, boats, etc.), military vehicles (e.g., armored personnel carriers or other armored vehicles, mobile rocket launchers, etc.), or other vehicles with limited general availability or low public use. In some such cases, the entity which provides the VIS 150 may lack a library of reference vectors suitable for categorizing the specialty vehicles of interest, or may not have access to a sufficient number of reference vectors for identifying certain ones of the specialty vehicles of interest. This may occur due to the low public circulation of the specialty vehicles, sparse availability of images of the specialty vehicles, or for any other reason. To this end, the method 700 of FIG. 7 may be used by operators of the VIS 150 to update the VIS 150 to support identification of the specialty vehicles in question.

Figure 9B:
FIG. 9B is an example graphical user interface for updating a vehicle identification system using user input.

With additional reference to FIG. 9B, there is illustrated an example GUI 900 for updating a vehicle identification system, for instance the VIS 150, using user input from an operator or other user of the VIS 150. The GUI 900 may be implemented as part of a program via which the VIS 150 may be updated, which may form part of the VIS 150 (or of a program which implements the VIS 150), or may be a program separate from the VIS 150. As illustrated in FIG.

9B, the GUI 900 is shown as being composed of a variety of elements; it should be understood that certain elements may only be displayed in response to a user interacting with certain other elements, that certain elements may not be visible at all times, and that the elements presented within the GUI 900 may vary depending on user input.

The GUI 900 includes an image pane 920 and an information pane 930, and also includes buttons 910 and 912, which are labelled "Add Vehicle" and "Save", respectively. In operation, a user may interact with the button 910 to initiate a process for adding a vehicle to the library 160, 220 and/or the categorization database 460 (i.e., to add a reference vector for a particular vehicle to the library 160, 220, and/or to add a reference vector and categorization information to the categorization database 460). In the illustrated example, the vehicle to be added is a boat 902, though it should be understood that the GUI 900 may be used to add a reference vector and/or categorization information for any type of vehicle to the library 160, 220 and/or the categorization database 460. Various forms of interaction with the GUI 900 and with elements thereof are considered: a user may move a pointer to the button 910 and click thereon, for instance using a mouse; the user may speak a voice command, for instance "Add Vehicle"; or the user may interact with the GUI 900 in any other suitable fashion. In some embodiments, the image pane 920 and the information pane 930 are displayed by the GUI 900 in response to the user interacting with the button 910. In some embodiments, in response to interacting with the button 910, the GUI 900 presents a file selection pane via which the user can select an image of the vehicle to be added; in the illustrated example, the image depicts the boat 902. Once an image is selected, the image is depicted within the image pane 920. In some other embodiments, the image depicting the vehicle may be sourced from a database of images without express selection by the user; for instance, a queue of images depicting unknown vehicles can be maintained by the VIS 150, and one of the images is selected from this queue and presented within the image pane 920. Other approaches by which an image of a vehicle is presented in the image pane 920 are also considered.

Once the image of the boat 902 is displayed, the user may be prompted (e.g., by a pop-up presented by the GUI 900) to trace a bounding box 922 which circumscribes the boat 902. In some embodiments, the bounding box 922 is presented in a contrasting colour to facilitate accurate positioning by the user. In some other embodiments, the GUI 900 may present a proposed bounding box 922, for instance as determined by an image recognition algorithm, which the user can approve or modify as needed. The user may also be prompted to enter categorization information about the boat 902 via the information pane 930, which contains various fillable fields via which the user can enter categorization information. In the illustrated example, the information pane 930 prompts the user for categorization information relating to the make, model, trim, year, class, and size of the boat 902, as well as an indication of the orientation of the boat 902 in the image. It should be noted that in other embodiments, the information pane 930 may prompt the user for different categorization information: for instance, the information pane 930 includes one or more optional fields, one or more user-definable fields, and the like. Additionally, although illustrated here as empty fields (e.g., for the entry of text by the user), one or more fields in the information pane 930 may be selectable fields (e.g., drop-down menus), toggleable fields (e.g., radio buttons, checkboxes, or the like), or any other suitable type of field.

Once the bounding box 922 is provided or approved, and the categorization information is entered into the information pane 930, the user can interact with button 912 to "save" the entered information. In the present context, to "save" the entered information includes performing at least some of the steps of the method 700. This includes obtaining a reference vector for the boat 902: for example, the program implementing the GUI 900 extracts the portion of the image of the boat 902 within the bounding box 922 and provides the portion of the image to the neural network 154 (or an equivalent neural network implemented by the server 212), which generates a reference vector for the boat 902. Additionally, saving the entered information includes updating the library 160, 220 and/or the categorization database 460 to include the reference vector for the boat 902, and (in the case of the categorization database 460) to include the categorization information provided by the user in the information pane 930. The updated library 160, 220 and/or categorization database 460 can then be used as part of subsequent vehicle identifications, having updated the functionality of the VIS 150 to identify categorizations for the boat 902.

Although described herein as being provided for use by operators of the VIS 150, it should be understood that the GUI 900, or GUIs similar to that depicted in FIG. 9B, may also be used by other users for generating reference vectors and associated categorization information to be included in the library 160, 220 and/or in the categorization database 460. For example, personnel associated with the entity responsible for providing the VIS 150 may use the GUI 900, or a similar GUI, when provisioning the categorization database 460 with reference vectors and/or categorization information, as appropriate. In some embodiments, the GUI 900 may be configured to process multiple images depicting different vehicles 902 in succession, allowing personnel to augment the library 160, 220 and/or the categorization database 460 with new reference vectors and/or categorization information for inclusion therein. For example, the GUI 900 includes an additional button via which a user can add other images depicting the same vehicle from different orientations, in order to generate reference vectors for the different orientations. In some embodiments, the GUI 900 may provide a field in which a user may provide a link to a webpage or other resource containing relevant categorization information for the vehicle 902 depicted in the image presented by the GUI 900. The program implementing the GUI 900 accesses the resource to extract therefrom information relating to the different categories listed in the information pane 930. Additionally, in some embodiments, some or all of the operations described in relation to the GUI 900 of FIG. 9B may be performed absent user input, for instance in an automated manner by a suitable system.

With reference to FIG. 10, there is illustrated a method 1000 for improving a vehicle identification functionality of a vehicle identification system, for example the VIS 150. In some cases, it can be beneficial for multiple reference vectors to exist for a particular vehicle: for example, a given make and model of a vehicle can have different trims which result in sufficiently different feature vectors as to lead to poor identification of the vehicle. Thus, though an operator of the VIS 150 may not be concerned with the trim categorization of vehicles, different reference vectors for different trim levels may result in improved vehicle identification. Other examples in which multiple reference vectors for vehicles sharing certain categorizations (e.g., make, model, generation, etc.) are also considered. Thus, as will be described in greater detail hereinbelow, the functionality of the VIS 150 may be improved by having multiple reference vectors with which to identify vehicles which share certain categorizations. As with the method 700, in some embodiments, part or all of the method 700 is performed by the VIS 150 itself. In some other embodiments, part or all of the method 1000 is performed by the server 212 or similar computing device operated by the entity responsible for providing the VIS 150. In some further embodiments, the method 1000 is performed in part by both the VIS 150 and the server 212, as appropriate.

As part of step 1010, the method 1000 includes, depending on whether the method 1000 is performed by the VIS 150 or by the server 212, providing or operating a vehicle identification system, for instance the VIS 150. The VIS 150 has functionality to identify a categorization of a first plurality of vehicles from an input image depicting a vehicle of the first plurality of vehicles by generating, using a neural network, a feature vector based on the input image and by comparing the feature vector to at least part of a library of reference vectors based on an orientation of the vehicle to identify at least one close match reference vector, wherein said identifying the categorization includes providing an indication of the categorization of the vehicle depicted in the input image based on the at least one close match reference vector. For instance, the first plurality of vehicles corresponds to the vehicles for which reference vectors are included in the library 160, 220; the input image is the input image 120 and/or 420; the neural network is the neural network 154 and/or the CNN 414; the library of reference vectors is the library 160, 220; and the like. In some embodiments, the VIS 150 is provided by the entity responsible for VIS 150, for instance the supplier, developer, maintainer, manufacturer, or the like. In some other embodiments, the VIS 150 is provided by a third-party which may have a relationship with the responsible entity, but is distinct therefrom, for instance a distributor. In some embodiments, operating the VIS 150 involves causing program instructions which implement the VIS 150 to be executing on a computing device, which may be any suitable computing device, for instance one coupled to the interface 118.

As part of step 1020, in some embodiments the method 1000 includes obtaining a subsequent input image depicting a subsequent vehicle present in the first plurality of vehicles; that is to say, the vehicle depicted in the input image is one for which a suitable reference vector already exists in the library 160, 220 of reference vectors. In some embodiments, the subsequent input image is obtained by the camera 212, for instance as part of the normal operations of the client site 110 and the VIS 150. In some other embodiments, the subsequent input image is obtained by the entity responsible for the VIS 150, for instance the developer or the like, as part of the responsible entity's usual operations, or as provided by another client of the responsible entity, which may operate a separate VIS and one or more cameras. In other embodiments, the subsequent input image may be obtained in any other suitable fashion.

Although the vehicle depicted in the subsequent input image is one for which a reference vector already exists in the library 160, 220 (e.g., the input image depicts a 2018 Honda Accord, and the library 160, 220 already includes a reference vector based on a 2018 Honda Accord), it may occur that the VIS 150 fails to identify the vehicle in the subsequent input image, that the comparisons between a feature vector generated from the subsequent input image fails to match to any of the reference vectors within the threshold distance, that multiple reference vectors are found to be similarly close matches with no distinct best close match, or that the existing reference vector is otherwise inadequate for identifying a categorization of the vehicle. This may occur due to differences in vehicle trim or optional features, due to aftermarket modifications or other changes to the vehicle, due to the orientation of the vehicle in the subsequent input image, or any other suitable reason. The subsequent input image may be determined to warrant the production of an additional reference vector based on the failure of the VIS 150 to accurately identify categorizations for the vehicle depicted in the subsequent input image, for instance on a basis similar to that described in conjunction with the method 700. In such a case, updating the library 160, 220 to include an additional reference vector for the vehicle depicted in the subsequent input image, which may replace an existing reference vector (e.g., if the existing reference vector is inaccurate) or may be included alongside the existing reference vector, may serve to improve the vehicle identification functionality of the VIS 150.

As part of step 1030, the method 1000 includes obtaining a subsequent reference vector associated with the subsequent vehicle present in the first plurality of vehicles (i.e., the vehicle for which a reference vector already exists in the library 160, 220). In some embodiments, obtaining the subsequent reference vector is performed in response to obtaining the subsequent input image, as part of step 1020. In embodiments in which the method 1000 is performed by the VIS 150, the VIS 150 may obtain the subsequent reference vector from the server 212 (i.e., from the entity responsible for the VIS 150), or may generate the subsequent reference vector itself. In embodiments in which the VIS 150 obtains the subsequent reference vector from the server 212, the server 212 may include categorization information along with the subsequent reference vector. The server 212 may implement its own version of the neural network 154 and/or the CNN 414 to generate the subsequent reference vector. In embodiments in which the VIS 150 generates the subsequent reference vector itself, the VIS 150 can provide the subsequent input image depicting the vehicle to the neural network 154 (or the CNN 414, depending on the implementation) to generate the subsequent reference vector. The VIS 150 may prompt an operator of the VIS 150 to provide categorization information for the vehicle (e.g., based on one or more of the closest matching reference vectors), or may transmit the additional reference vector to the server 212 with an indication of the vehicle (which may include the additional input image, other contextual information, or the like). In any case, because the neural network 154 and the CNN 414 are used to generate feature vectors, either can also be used to generate new reference vectors, without any retraining of the neural network 154 or the CNN 414 required.

As part of step 1040, the method 1000 includes updating the library of reference vectors, for instance either or both the library 160, 220, to include the at least one subsequent reference vector thereby improving the functionality of the vehicle identification system, for instance to improve the ability of the VIS 150 to categorize the subsequent vehicle. Because the neural network 154 or the CNN 414 is used to generate feature vectors, the updating of the library 160, 220 updates the functionality of the VIS 150 without retraining the neural network 154 or the CNN 414. In embodiments in which the VIS 150 maintains the library of reference vectors within the datastore 156 (i.e., the library 160), the VIS 150 can directly update the library 160, whether the additional reference vector is obtained from the server 212 or generated within the VIS 150. In embodiments in which the library of reference vectors is maintained by the server 212 at the remote site 210 (i.e., the library 220), the server 212 may cause the library 220 within the datastore 214 to be updated once the additional reference vector is generated by the server 212, or once the additional reference vector is received at the server 212 from the VIS 150.

As part of step 1050, in some embodiments the method 1000 includes updating a corpus of images used to train the neural network, for instance the neural network 154 or the CNN 414, to include the subsequent image. As described hereinabove, the neural network used by the VIS 150 (whether the neural network 154 or the CNN 414) is trained by presenting the neural network with pairs of images, and training the neural network to determine when the images depict the same vehicle (i.e., vehicles sharing categorizations). When the VIS 150 and/or the server 212 determine that the subsequent input image depicts a vehicle for which a reference vector is already present in the library 160, 220, but which was not sufficient for identifying the vehicle in the subsequent input image, this may signal that the subsequent input image is a good candidate for training the neural network of the VIS 150. Although the functionality of the VIS 150 can be updated or otherwise improved without retraining the neural network, the neural network itself may be improved, for instance by training the neural network on an improved and/or expanded corpus of images. Thus, in some embodiments, the VIS 150 and/or the server 212 may cause the subsequent input image, and any relevant metadata or other contextual information, to be added to a corpus of images used to train the neural network 154 or the CNN 414. For instance, the corpus of images is stored in the datastore 214, and upon determining that a particular input image is a suitable subsequent input image (within the context of the method 1000), the VIS 150 can transmit the subsequent input image to the server 212 over the network 202 for inclusion in the corpus of images stored in the datastore 214. The neural network of the VIS 150 may be retrained at any suitable time, and may be provided to operators of the VIS 150 as part of an update to the VIS 150, as appropriate.

As part of step 1060, when the method 1000 is implemented at least in part by the VIS 150, in some embodiments the method 1000 includes identifying, with the VIS 150, an additional vehicle sharing at least one categorization with the subsequent vehicle and depicted in an additional input image on the basis of the updated library 160, 220 of reference vectors without retraining the neural network 154 (or the CNN 414). As noted hereinabove, the functionality of the VIS 150 can be updated without retraining the neural network 154 or the CNN 414; by updating the library 160, 220 with additional reference vectors, the VIS 150 can be updated to detect new vehicles. When an additional vehicle, which shares categorization(s) with both a previously-known vehicle (i.e., for which a reference vector already existed in the library 160, 220) and the subsequent vehicle (e.g., a vehicle of the same make, model, trim, generation, etc. as the unknown vehicle) is later depicted in an additional input image, the VIS 150 can identify the subsequent vehicle by comparing the feature vector of the subsequent vehicle to one or both of the subsequent reference vector (obtained at step 1030) and the reference vector which previously existed within the library 160, 220. In embodiments in which the library 160, 220 is updated to include the subsequent reference vector, including multiple reference vectors for vehicles which share certain categorizations can facilitate the identification of vehicles by the VIS 150.

Figure 11:
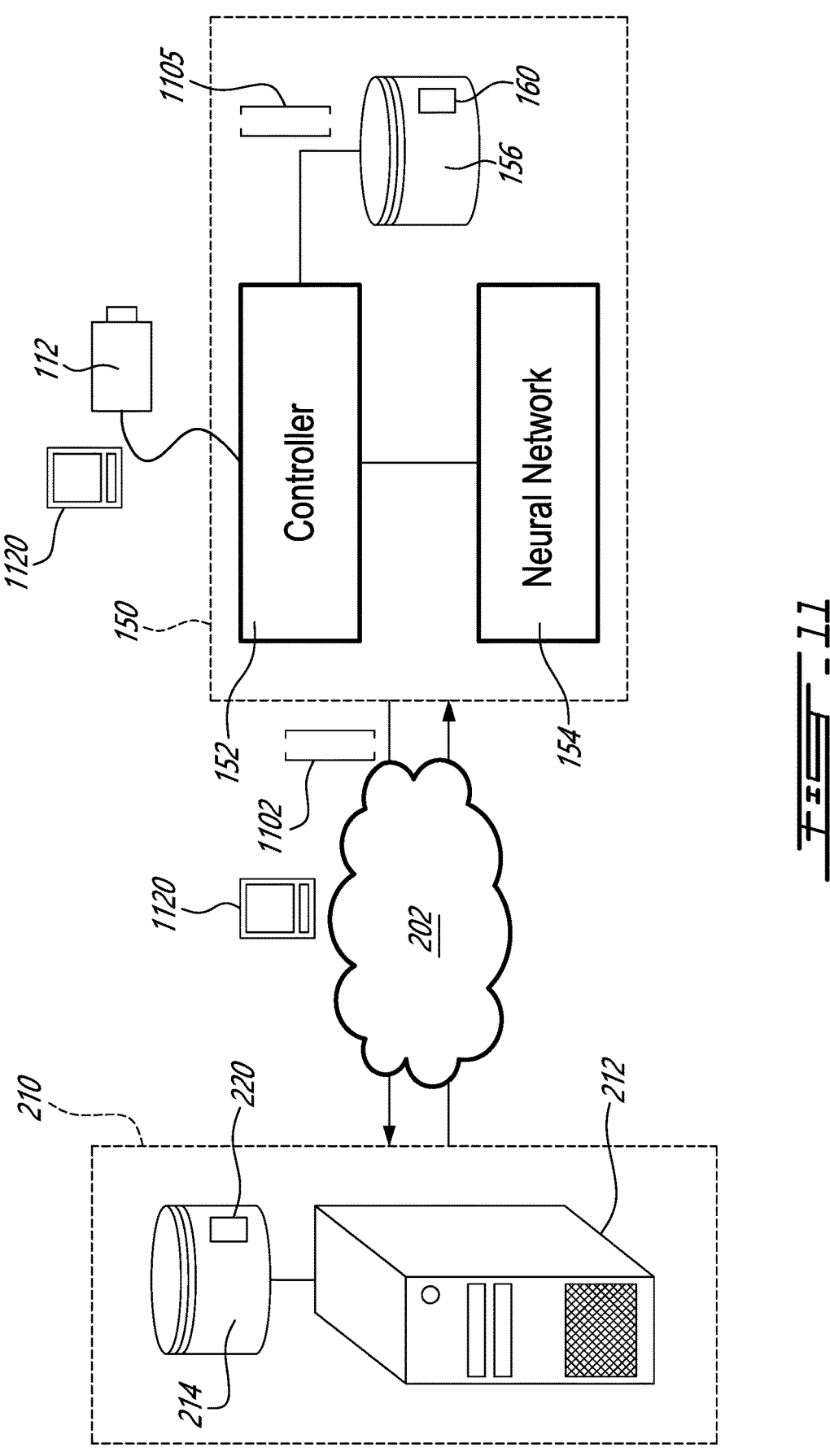
FIG. 11 is a schematic diagram illustrating the vehicle identification system of FIG. 2 performing an example implementation of certain steps of FIG. 10.

With additional reference to FIG. 11, an example implementation of certain steps of the method 1000, when performed by the VIS 150, is depicted. An input image 1120, depicting vehicle for which a reference vector already exists within the library 160 and/or the library 220, is provided to the VIS 150. The VIS 150 processes the input image 1120 similarly to any other input image, as described hereinabove. The input image 1120 is used to generate a vector 1105; once it is determined that the vehicle depicted in the input image 1120 is a vehicle for which a reference vector already exists in the library 160, 220, which is inadequate for identifying the vehicle depicted in the input image, the vector 1105 may serve as a subsequent reference vector for the vehicle in question. Once this determination is made, the subsequent reference vector 1105 may be stored in the library 160, in association with the categorization information for the vehicle in question. In some embodiments, the subsequent reference vector 1105, the associated categorization information, and in some embodiments the input image 1120, may be transmitted to the server 212 via the network 202. The library 220 may be updated with the subsequent reference vector 1105 and the associated categorization information, as appropriate. In some embodiments, the input image 1120 may also be used to update a corpus of images used to train the neural network 154, as described hereinabove. For example, the input image 1120 may be stored in the data-store 214 with a flag or other indicator that the input image 1120 should be reviewed by the entity responsible for the VIS 150, for instance to assess whether retraining of the neural network 154 should be performed, or to assess whether the input image 1120 should be included in the aforementioned corpus of images. Although the embodiment depicted in FIG. 11 (and the related disclosure herein) describes an embodiment in which the VIS 150 generates the reference vector 1105, it should be understood that in other embodiments, the VIS 150 may provide the input image 1120 to the server 212 alongside an indication that the vehicle depicted in the input image 1120 was not identifiable, and then obtain the reference vector 1105 and, in some cases, associated categorization information from the server 212 once the server 212 has generated the reference vector and obtained the categorization information. Other embodiments are also considered.

With reference to FIG. 12, there is illustrated a schematic diagram of an example computing device 1200. As depicted, the computing device 1200 includes at least one processing unit (or processor) 1210, a memory 1220, and program instructions 1230 stored within the memory 1220, as well as input and output interfaces (I/O interfaces) 1202 and 1204, respectively. For simplicity, only one computing device 1200 is shown; the VIS 150, a computing device associated with the interface 118, the server 212, and/or any computing devices included as part of other elements of the present disclosure (e.g., the camera 212) may be embodied by one or more implementations of the computing device 1200. The computing devices 1200 may be the same or different types of devices. The components of the computing device 1200 may be connected in various ways including directly coupled, indirectly coupled via a network, and distributed over a wide geographic area and connected via a network, for instance via a cloud computing implementation.

The I/O interfaces 1202, 1204 may include one or more media interfaces, via which removable media or other data sources may be coupled, one or more network interfaces, or any other suitable type of interface. The I/O interfaces 1202, 1204 of the computing device 1200 may additionally, in some embodiments, provide interconnection functionality to one or more input devices, such as a keyboard, mouse, camera, touch screen and a microphone, or with one or more output devices such as a display screen and a speaker, for instance those devices described as forming the interface 118. In embodiments in which the I/O interfaces 1202, 1204 include one or more network interfaces, the network interface(s) of the computing device 1200 may enable the computing device 1200 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The processing unit 1210 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. The memory 1220 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically erasable programmable read-only memory (EEPROM), Ferroelectric RAM (FRAM) or the like.

In certain embodiments, the computing device 1200 is operable to register and authenticate users (using a login, unique identifier, and password for example) prior to providing access to applications, a local network, network resources, other networks, and network security devices. The computing device 1200 may serve one user or multiple users.

For example, and without limitation, the computing device 1200 may be a server, network appliance, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods and/or implementing the systems described herein.

Although the present disclosure focuses primarily on systems and methods for identifying vehicles, including for identifying a categorization of a vehicle depicted in an input image, the embodiments described herein may also be applied to other fields of endeavor. For instance, the systems and methods may readily be applied to identifying categorization(s) of other types of objects of interest beyond vehicles, for instance to retail articles, to plants and animals, and to persons. Because the approach for the identification and categorization of vehicles relies on comparing feature vectors to reference vectors as part of what may be termed a reidentification of the vehicles, other types of objects may also be reidentified in similar fashion.

Thus, in one non-limiting example, a person entering a particular space (e.g., a store, a mall, a nature reserve, etc.) may be captured in a first image, from which a reference vector for that person may be generated. When other cameras capture images depicting the person, feature vectors may be generated therefrom and compared to a library of reference vectors, including based on a particular orientation of the person (as depicted in the images), in order to reidentify the person. This may permit the entity operating the space, or the cameras disposed therein, to track the movements of the person within the space. Notably, the reference vector can be generated absent any identifying information for the person captured in the first image; that is to say, the reference vector is associated with a particular person, but no information identifying of said person need be associated with the reference vector. In this fashion, the tracking of the person through the space is performed in an anonymous and non-identifying fashion, reducing the risk of privacy violations toward the person. In some cases, multiple spaces managed by a common entity, or which have an information sharing agreement therebetween, may collaborate to track persons anonymously and non-identifiably across different spaces. For instance, the shopping patterns of persons at a mall may be tracked if the operators of the various venues in the mall share information about the reference vectors and feature vectors of persons who transit through the venues in the mall. Other uses cases are also considered.

The embodiments of the methods, systems, devices, and computer-readable media described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references have been made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The foregoing discussion provides many example embodiments. Although each embodiment represents a single combination of inventive elements, other examples may include all possible combinations of the disclosed elements. Thus, if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and at least some of the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions, and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the examples described above and illustrated herein are intended to be examples only, and the appended claims are intended to include within their scope such processes, machines, manufacture, compositions of matter, means, methods, or steps.

The invention claimed is:

1. A method for identifying a categorization of a vehicle depicted in an input image, comprising:

generating, using a trained neural network, a library of reference vectors comprising different reference vectors for different orientations of known vehicles, each reference vector having vehicle categorization information associated therewith and providing a numerical representation of a known vehicle depicted in at least one reference image;

augmenting, using the trained neural network and without retraining of the neural network, the library of reference vectors by generating new reference vectors based on new reference images of new vehicles;

generating, using the trained neural network, a feature vector of the vehicle based on the input image, the feature vector providing a numerical representation of the vehicle;

determining, at a controller coupled to the neural network and absent user input, an orientation of the vehicle based on the input image;

selecting, at the controller, a set of reference vectors from the library of reference vectors based on the orientation of the vehicle;

identifying, at the controller, at least one close match reference vector by comparing the feature vector of the vehicle to a plurality of reference vectors including at least said selected set of reference vectors;

determining, at the controller, the categorization of the vehicle based on the at least one close match reference vector; and outputting, at the controller, the categorization of the vehicle.

2. The method of claim 1, comprising selecting, from a plurality of images produced by a camera, at least one image containing the vehicle as the input image.

3. The method of claim 2, wherein said selecting the at least one image containing the vehicle as the input image comprises performing object recognition on the plurality of images to identify the at least one image containing the vehicle.

4. The method of claim 2, wherein said selecting the at least one image containing the vehicle as the input image comprises performing quality detection on the plurality of images to identify, of the plurality of images, the at least one image based on meeting a quality threshold.

5. The method of claim 2, wherein said selecting the at least one image containing the vehicle as the input image comprises obtaining a video stream from a camera and extracting, from the video stream, the input image.

6. The method of claim 1, wherein said determining the orientation comprises providing the input image to a classifier neural network and obtaining, from the classifier neural network, an orientation indication for the vehicle.

7. The method of claim 1, wherein said determining the orientation comprises identifying a camera which produced the input image, and wherein said determining the orientation is based on a known physical configuration of the camera.

8. The method of claim 1, wherein said identifying the at least one close match reference vector comprises evaluating projected distances between the feature vector of the vehicle and the plurality of reference vectors.

9. The method of claim 1, wherein said identifying the at least one close match reference vector comprises identifying a predetermined number of close match reference vectors, and wherein said outputting the categorization of the vehicle comprises indicating at least one categorization for each of the predetermined number of close match reference vectors.

10. The method of claim 1, wherein said outputting the categorization of the vehicle comprises indicating at least one of a make and a model of the vehicle.

11. The method of claim 1, wherein said outputting the categorization of the vehicle comprises indicating at least one of a generation, a vehicle class, and a vehicle size of the vehicle.

12. The method of claim 1, wherein said outputting the categorization of the vehicle comprises indicating whether the vehicle is equipped with modifications relative to a base model.

13. A vehicle identification system for identifying a categorization of a vehicle depicted in an input image, comprising:

a trained neural network configured for:

generating a library of reference vectors comprising different reference vectors for different orientations of known vehicles, each reference vector having vehicle categorization information associated therewith and providing a numerical representation of a known vehicle depicted in at least one reference image;

augmenting, without retraining of the neural network, the library of reference vectors by generating new reference vectors based on new reference images of new vehicles; and generating a feature vector of the vehicle based on the input image, the feature vector providing a numerical representation of the vehicle; and a controller coupled to the neural network for obtaining the feature vector therefrom and configured for:

determining, absent user input, an orientation of the vehicle based on the input image;

selecting a set of reference vectors from the library of reference vectors based on the orientation of the vehicle;

identifying at least one close match reference vector by comparing the feature vector of the vehicle to a plurality of reference vectors including at least said selected set of reference vectors;

determining the categorization of the vehicle based on the at least one close match reference vector; and outputting the categorization of the vehicle.

14. A method for updating a vehicle identification system, comprising:

operating the vehicle identification system having functionality to identify a categorization of a first plurality of vehicles from an input image depicting a vehicle of the first plurality of vehicles by generating, using a trained neural network, a feature vector based on the input image, the feature vector providing a numerical representation of the vehicle, and by comparing the feature vector to at least part of a library of reference vectors based on an orientation of the vehicle determined absent user input to identify at least one close match reference vector, the library of reference vectors comprising different reference vectors for different orientations of known vehicles, each reference vector having vehicle categorization information associated therewith and providing a numerical representation of a known vehicle depicted in at least one reference image, wherein said identifying the categorization comprises determining the categorization of the vehicle depicted in the input image based on the at least one close match reference vector and providing the categorization of the vehicle;

obtaining at least one additional reference vector associated with at least one additional vehicle absent from the first plurality of vehicles;

updating the library of reference vectors to include the at least one additional reference vector thereby updating the functionality of the vehicle identification system to identify a categorization of the at least one additional vehicle; and identifying, with the vehicle identification system, a subsequent vehicle sharing at least one categorization with the additional vehicle and depicted in a subsequent input image on the basis of said updated library of reference vectors without retraining the neural network.

15. The method of claim 14, wherein said obtaining the at least one additional reference vector comprises using the neural network of the vehicle identification system to generate the at least one additional reference vector based on reference images of the at least one additional vehicle.

16. The method of claim 14, wherein said updating the library of reference vectors of the vehicle identification system comprises associating categorizations of the at least one additional vehicle with the at least one additional reference vector.

17. The method of claim 16, wherein said associating the categorizations of the at least one additional vehicle comprises obtaining the categorizations of the at least one vehicle from a source affiliated with a manufacturer of the at least one vehicle.

18. The method of claim 16, wherein said associating the categorizations of the at least one additional vehicle comprises obtaining the categorization of the at least one vehicle from a user of the vehicle identification system based on user input provided by the user.

19. The method of claim 14, wherein said obtaining the at least one additional reference vector comprises receiving the at least one additional reference vector from a remote computer operated by an entity providing the vehicle identification system.

20. The method of claim 14, wherein said obtaining the at least one additional reference vector comprises generating the at least one additional reference vector using the neural network of the vehicle identification system.

21. The method of claim 14, comprising obtaining an additional input image depicting an additional vehicle absent from the first plurality of vehicles, wherein said obtaining the at least one additional reference vector is performed in response to said obtaining the additional input image.

22. The method of claim 21, wherein said obtaining the additional input image comprises determining that the additional input image depicts the additional vehicle absent from the first plurality of vehicles based on at least one of:
   (a) a distance between an additional feature vector of the additional vehicle, generated using the neural network, and at least one reference vector of the library of reference vectors associated with the first plurality of vehicles; and
   (b) a ratio of a first distance between an additional feature vector of the additional vehicle, generated using the neural network, and a first one of the plurality of reference vectors and a second distance between the second feature vector and a second one of the plurality of reference vectors exceeding a predetermined ratio threshold.

23. The method of claim 21, comprising providing the additional input image to a remote computer operated by an entity providing the vehicle identification system.

24. The method of claim 21, wherein said obtaining the additional input image comprises obtaining the image from the vehicle identification system in response to the vehicle identification system failing to identify the vehicle.

25. A method for improving a vehicle identification functionality of a vehicle identification system, comprising:
   operating the vehicle identification system having functionality to identify a categorization of a first plurality of vehicles from an input image depicting a vehicle of the first plurality of vehicles by generating, using a trained neural network, a feature vector based on the input image, the feature vector providing a numerical representation of the vehicle, and by comparing the feature vector to at least part of a library of reference vectors based on an orientation of the vehicle determined absent user input to identify at least one close match reference vector, the library of reference vectors comprising different reference vectors for different orientations of known vehicles, each reference vector having vehicle categorization information associated therewith and providing a numerical representation of a known vehicle depicted in at least one reference image, wherein said identifying the categorization comprises determining the categorization of the vehicle depicted in the input image based on the at least one close match reference vector and providing the categorization of the vehicle;
   obtaining a subsequent feature vector associated with a subsequent vehicle present in the first plurality of vehicles;
   updating the library of reference vectors based on the subsequent feature vector to improve the vehicle identification functionality of the vehicle identification system; and
   identifying, with the vehicle identification system, an additional vehicle sharing at least one characterization with the subsequent vehicle and depicted in an additional input image on the basis of said updated library of reference vectors without retraining the neural network.

26. The method of claim 25, wherein said updating the library of reference vectors comprises updating the database to additionally contain the subsequent feature vector.

27. The method of claim 25, wherein said updating the library of reference vectors comprises updating the database to replace a given one of the plurality of reference vectors with the subsequent feature vector.

28. The method of claim 25, wherein said obtaining the subsequent feature vector comprises one of:
   (a) receiving the subsequent feature vector from a remote computer operated by an entity providing the vehicle identification system; and
   (b) obtaining, by the vehicle identification system, a subsequent input image depicting the subsequent vehicle and generating, by the vehicle identification system, the subsequent feature vector.

29. The method of claim 28, comprising obtaining, by the vehicle identification system, a subsequent input image depicting the subsequent vehicle and transmitting the subsequent input image from the vehicle identification system to the remote computer, wherein said receiving the subsequent feature vector from the remote computer is performed responsive to said transmitting the subsequent input image.

30. The method of claim 28, wherein said obtaining the subsequent input image is performed in response to at least one of:
   (a) the vehicle identification system determining the subsequent feature vector is farther than a predetermined distance threshold from the plurality of reference vectors; and
   (b) the vehicle identification system determining that a ratio of a first distance between the subsequent feature vector and a first one of the plurality of reference vectors and a second distance between the subsequent feature vector and a second one of the plurality of reference vectors exceeds a predetermined ratio threshold.

* * * * *